United States Patent [19]

Shibata et al.

[11] 4,318,139
[45] Mar. 2, 1982

[54] METHOD AND APPARATUS FOR CONTROLLING A MICROCASSETTE TAPE TRANSPORT

[75] Inventors: Tutomu Shibata; Akira Osanai; Hideo Tomabechi, all of Hachioji; Kenji Fujibayashi, Tokyo, all of Japan

[73] Assignee: Olympus Optical Co., Ltd., Tokyo, Japan

[21] Appl. No.: 134,064

[22] Filed: Mar. 26, 1980

[30] Foreign Application Priority Data

Apr. 6, 1979 [JP] Japan .................................. 54-41601

[51] Int. Cl.$^3$ ............................................ G11B 15/48
[52] U.S. Cl. ...................................... 360/71; 360/74.1
[58] Field of Search .............................. 360/71, 72–74

[56] References Cited

U.S. PATENT DOCUMENTS 4,101,936 7/1978 Shinhara ............................... 360/71

Primary Examiner—John H. Wolfe
Attorney, Agent, or Firm—Frishauf, Holtz, Goodman and Woodward

[57] ABSTRACT

A control apparatus for controlling a microcassette tape transport of one motor type includes a first designation means (106) for designating a constant speed transport mode, a rewind mode, and a fast forward mode; a second designation means (124) for designation a direction of the motor rotation; a third designating means (122) for designating a direction of the tape transport. In order to effect the control of a tape transport on the basis of the combination of designations by the first, second and third designation means, the apparatus further includes a first memory means (301) which operates, e.g. when the operation mode shifts from the constant speed transport mode to the rewind mode, and is used when a direction of the motor rotation is switched; a second memory means (401) which operates from the detection of the tape end until the motor stops and reverses its direction of the rotation, and provides a signal of the tape end detection; a third memory means (601) which operates when the operation mode shifts from the constant speed transport mode to the rewind mode or when it is returned from the rewind mode to the constant speed transport mode, and is used to distinguish between the rewind mode and the fast forward mode; a fourth memory means (701) which operates, e.g. when the operation mode shifts from the constant speed transport mode to the rewind mode or the fast forward mode, and is used to change a speed of the motor rotation so that the motor is rotated at high speed in the rewind mode or the fast forward mode; a fifth memory means (801) which operates, e.g. when the operation mode shifts from the constant speed transport mode to the rewind mode, and decides the rotation and stop of the motor; whereby memory states of said first, fourth and fifth memory means are determined depending on the memory contents of said first to fifth memory means and designations by said first to third designation means.

12 Claims, 14 Drawing Figures

METHOD AND APPARATUS FOR CONTROLLING A MICROCASSETTE TAPE TRANSPORT

BACKGROUND OF THE INVENTION

The present invention relates to a logic control system for use in a microcassette tape recorder or a microcassette tape player.

Recently, an increasing demand for a microcassette as a music source has existed for a reason that, in the case of the microcassette system, a container for a cassette tape is small and a tape transport mechanism may be made small. The size-reducible feature of the tape transport mechanism is useful particularly when it is adopted for a car-stereo system which must be installed in a limited-space. In a tape playback device used in a car-stereo system, it is desired that the tape playback device is provided with an auto-reverse mechanism in order to improve its operability. In order to effectively realize the size reduction of the tape transport mechanism, the number of large mechanical parts in the mechanism, for example, a capstan flywheel and a motor, must be as small as possible. A single-motor center capstan system has been known as one of the tape playback devices which is well adapted for a tape transport mechanism with an auto-reverse function and a satisfaction of the requirements for the size reduction.

A mechanism for a microcassette recorder employing a single-motor center capstan system is well known. In a small sized single-motor center capstan tape transport mechanism, the mechanism disclosed in the patent disclosure, it is very difficult to realize control of the tape transport operation including an auto-reverse feature by using mainly mechanical components. An attempt to mechanically effect the tape transport control makes the mechanism of the tape recorder complicated and makes it difficult to simplify the mechanism. Besides, it adversely affects the durability, reliability and cost of the tape recorder.

SUMMARY OF THE INVENTION

Accordingly, the primary object of the invention is to provide a method and an apparatus for controlling a microcassette tape transport which can simplify a tape transport mechanism and reduce its size and effect various types of its controls.

According to a first aspect of the invention, a method for controlling a single-motor type microcassette tape transport which transports tape in a microcassette at a constant speed, comprises:

terminating the control of a microcassette tape transport when no microcassette tape is loaded into a transport (step 3 "NO");

judging, when a microcassette tape is loaded thereinto (step 3 "YES"), whether or not it is immediately after the loading of the microcassette tape into the tape transport (step 4) and, when it is immediately after the loading, rotating said motor at a constant speed (step 6), and, when it is not immediately after the loading, continuing a constant speed rotation of the motor (step 6);

reversing the direction of the constant speed transport of the tape of a microcassette caused by the constant speed rotation of the motor (step 8 "YES") by stopping the motor (step 10), reversing the direction of rotation of the motor (step 11), and then causing the motor to rotate at a constant speed in said reverse direction (step 6);

changing the operation mode of the tape transport from a constant speed tape transporting mode to a rewind mode (step 12 "YES") responsive to a command, by judging whether or not the tape transport in the rewind mode (step 13) and, if it is not in the rewind mode (step 13 "NO"), stopping the motor (step 14), reversing the direction of rotation of the motor (step 15) and subsequently causing the motor to rotate at high speed (step 16), and, if it is in the rewind mode (step 13 "YES"), causing the motor to rotate at high speed (step 16);

changing the operation mode of the tape transport from the constant speed tape transporting mode to fast forward mode (step 12 "NO") responsive to a command by judging whether or not it is after the rewind mode (step 18), and, if it is after the rewind mode (step 18 "YES"), stopping the motor (step 19), reversing the direction of rotation of the motor (step 20) and subsequently causing the motor to rotate at high speed (step 22), and if it is not after the rewind mode (step 18 "NO"), causing the motor to rotate at high speed (step 22);

returning the operation mode from the rewind mode to the constant speed transport mode (step 12 "NO"; step 18 "YES"; step 21 "NO"), by stopping the motor (step 19), reversing the direction of rotation of the motor (step 20) and subsequently causing the motor to rotate at a constant speed (step 6);

returning the operation mode from the fast forward mode to the constant speed tape transporting mode (step 12 "NO"; step 18 "NO"; step 21 "NO"), by causing the motor to rotate at a constant speed (step 6); and changing the operation mode from the rewind mode to the constant speed tape transporting mode to transport the microcassette tape in an opposite direction to that in the rewind mode (step 17 "YES"), by stopping the motor (step 23), reversing the direction of rotation of the motor (step 24), and subsequently causing the motor to rotate at a constant speed (step 6).

According to a second aspect of the invention, an apparatus for controlling a single-motor type microcassette tape transport, comprises:

a first designation means (106) for selectively designating a constant speed tape transporting mode, a rewind mode, or a fast forward mode;
a second designation means (124) for designating a direction of the motor rotation;
a third designation means (122) for designating a direction of the tape transport;
means for detecting the end of the tape; and
means responsive to end of tape detection for stopping the motor and reversing its direction of rotation;

the improvement comprising:

control means coupled to said first, second and third designation means and to said tape transport for controlling the tape transport on the basis of a combination of designations by said first, second and third designation means, said control means comprising:
a first memory means (301) responsive at least to said first designating means and operating when the operation mode is shifted from the constant speed tape transporting mode to the rewind mode, when it is returned from the rewind mode to the constant speed tape transporting mode, or when the end of a tape is detected by said end of tape detecting means, and generating a signal indicating that a direction of the motor rotation is reversed;

a second memory means (401) responsive at least to said end of tape detecting means and operating from the time of detection of the end of tape until the motor stops and reverses its direction of rotation, and for providing a signal indicating tape end detection;

a third memory means (601) responsive to said first designation means and operating when the operation mode is shifted from the constant speed tape transporting mode to the rewind mode or when it is returned from the rewind mode to the constant speed tape transporting mode, and generating a signal to distinguish between the rewind mode and the fast forward mode;

a fourth memory means (701) responsive at least to said first designation means and operating when the operation mode is shifted from the constant speed tape transporting mode to the rewind mode or the fast forward mode, when it is returned from the rewind mode or the fast forward mode to the constant speed tape transporting mode, or when the tape end is detected in the rewind mode or the fast forward mode, and generating a signal to change a speed of the motor rotation so that the motor is rotated at high speed in the rewind mode or the fast forward mode; and a fifth memory means (801) responsive at least to said first designation means and operating when the operation mode is shifted from the constant speed tape transporting mode to the rewind mode, when it is returned from the rewind mode to the constant speed tape transporting mode, or when the tape end is detected, for generating a signal for causing rotation or alternatively stopping of the motor;

whereby the memory states of said first, fourth and fifth memory means are determined depending on the memory contents of at least one of said first to fifth memory means and designations by at least one of said first to third designation means.

The control apparatus according to the invention electrically controls a tape transport mechanism in a tape transport/deck for a microcassette. Accordingly, the mechanism is simplified and reduced in size, and a variety of controls are possible. The present invention is well adapted for a single-motor type microcassette tape recorder which is directed to simplify the tape transport mechanism for its size reduction and to provide an auto-reverse function to the mechanism. It is noted here accordingly that the logic control apparatus according to the invention is different from the logic control system employed in some of the open reel type tape recorders or some of the Philips type cassette recorders, for example, although its application is similar to the latter. In other words, the invention is based on a unique systematic combination of the microcassette tape transport mechanism of the single-motor type and the logic control system.

Other objects and features of the invention will be apparent from the following description taken in connection with the accompanying drawings.

DESCRIPTION OF THE PREFERRED EMBODIMENTS

Throughout the drawings, like reference symbols are used to designate like or equivalent parts or portions, for simplicity of illustration and explanation.

Figure 1:
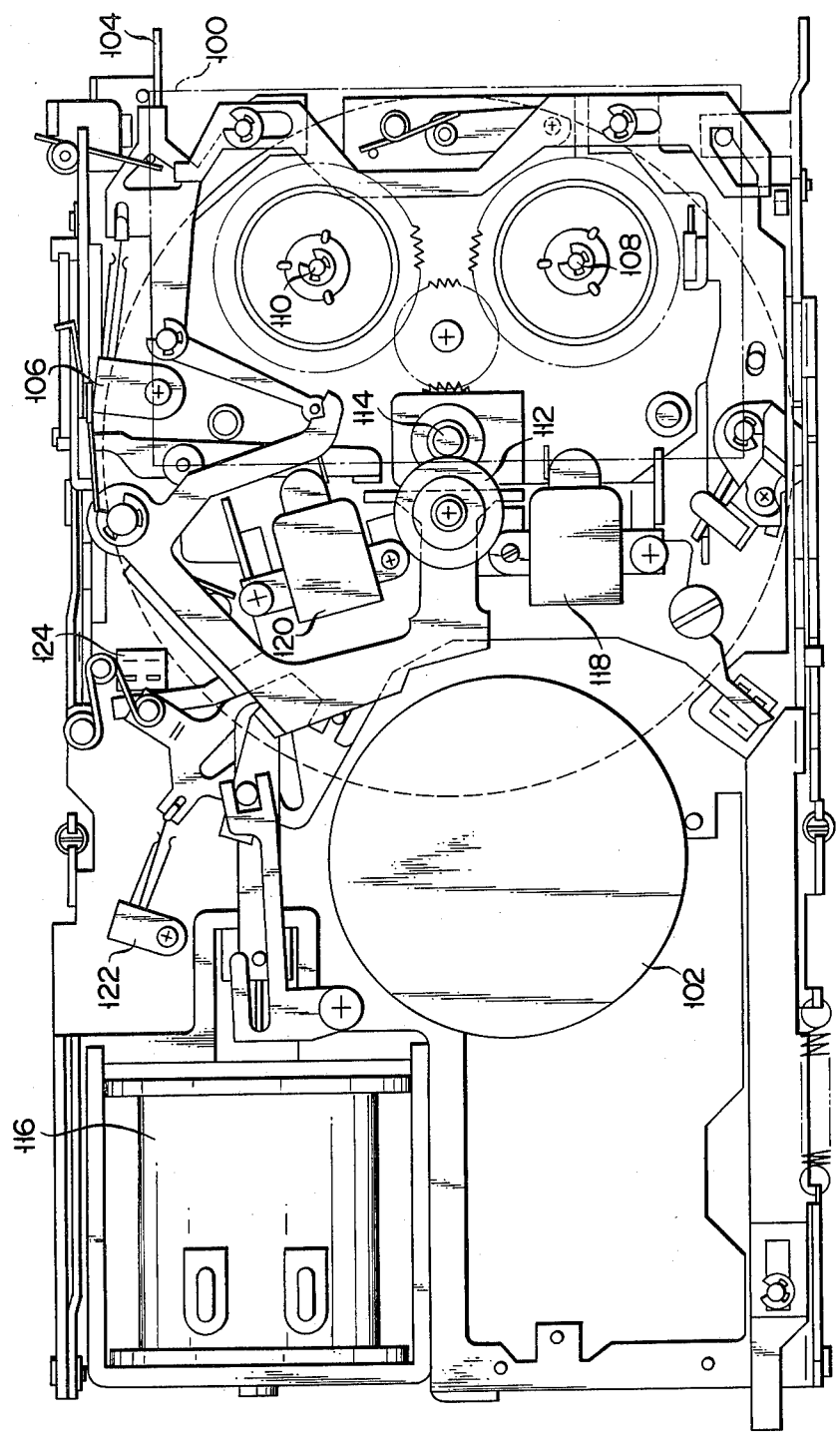
FIG. 1 shows a plan view of a tape transport mechanism to which the invention is applied.
Figure 2:
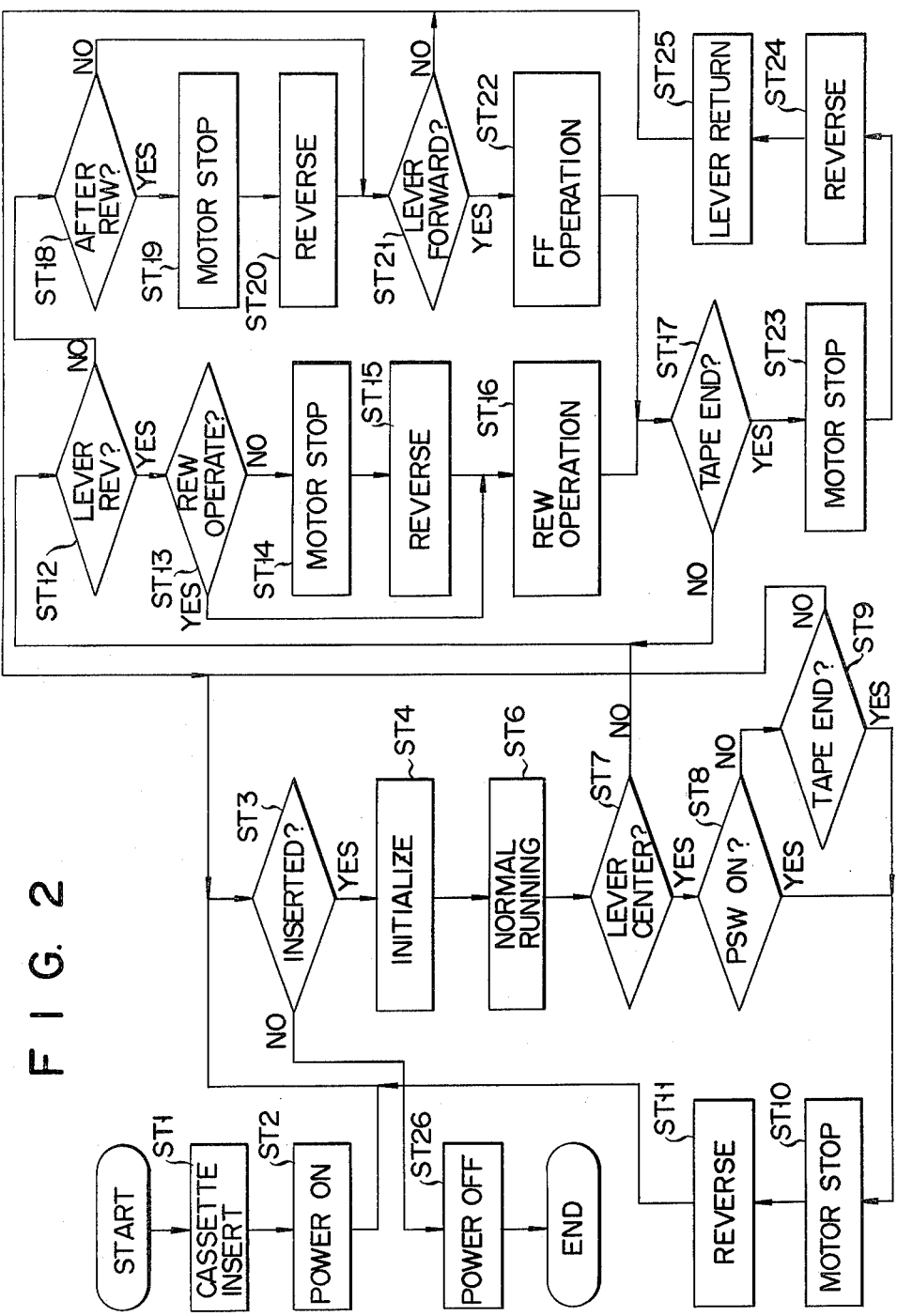
FIG. 2 shows a flow chart for illustrating a control procedure of a logic control according to the invention.

FIG. 1 shows an example of a tape transport mechanism for which the invention is applied. FIG. 2 shows a block flow chart for illustrating a control sequence according to the invention. In a step 1, a cassette tape 100 is inserted into a mechanism. In a step 2, a power source for the whole apparatus is turned on. Upon the power being on, a step 3 judges if the cassette 100 is loaded into the mechanism or not. The judgement is performed depending on the ON and OFF states of the power source. In this example, since the cassette 100 is inserted or loaded into the mechanism (YES), a step 4 is executed. In the step 4, an initializing pulse Ini is set to logical "1". The initializing pulse Ini occurs instantaneously only immediately after the power source is turned on. In step 6, a motor 102 in the mechanism is rotated at a constant speed.

In a step 7, it is judged whether an operation lever 104 is at the central position or not. The operation lever 104 may take three positions; the central position, a position for indicating a foward direction of the tape transport (referred to as a forward tape running), and a position for indicating a reverse direction of tape transport (referred to as a reverse tape running). Those three positions are converted into corresponding electrical information by means of a mechanical switch 106. When the operation lever 104 is at the central position (YES), i.e. when the tape is running, a step 8 is executed. The step 8 judges if a program switch (denoted as 206 in FIG. 4) is turned on or not. The program switch is turned on when the tape transport direction of the running tape at a constant speed is reversed, i.e. when the mechanism is in a reverse mode. If the program switch is not turned on (NO), the control procedure advances to a step 9.

The step 9 judges if the tape transportation within the cassette is completed or not, or if the tape remains at a tape supply hub side or not. At the end of the tape, supply and take-up reel shafts 108 and 110 stop their rotations. Therefore, the end of the tape can be learned by detecting the stop of the rotation of the reel shaft 108 or 110. The detection may be realized, for example, by a proper combination of a magnet rotating interlocked with the reel shaft 108 or 110 and a semiconductor Hall element for detecting a magnetic field change due to the magnet rotation. When the tape end is not yet detected and the tape still runs, the control procedure returns to the step 3.

If the step 3 judges that the cassette 100 is loaded, it shifts to the step 4. At this time, the initializing pulse Ini has returned to logic "0" already. When the operation lever 104 is still at the central position, the program switch is OFF and the tape end is not yet detected, a constant speed transport of the tape continues through a loop of the steps 3, 4, 6, 7, 8 and 9.

When the program switch is turned ON in the step 8 or when the tape end is detected in the step 9, the flow control shifts to a step 10. The step 10 interrupts the power supply to the motor 102. Upon the power supply interruption, the motor stops its rotation. Then, a step 11 reverses the polarity of the power supply to the motor 102 and power with the reversed polarity is again supplied to the motor 102. When a DC motor, for example, is used, the polarity of the current flow is reversed. The stop of the rotation of the motor 102 may be detected by checking the counter electromotive force of the motor 102 after the power supply to the motor 102 is interrupted. The reason why the motor 102 is temporarily stopped in the step 100 is to protect the motor 102. If the power with the reversed polarity is supplied to the motor 102 which is still running, an exessive current flows into the armature of the motor 102 to possibly burn the brush of the motor 102. The inverted power supply to the motor 102, i.e. the application of the inverse voltage to the same, in the step 11 may be made after a given time lapse from the time point of the power supply interruption in the step 10. In this case, the detecting step of the rotation stop of the motor 102 may be omitted. When the polarity reversal of the power supplied to the motor 102 is performed in the step 11, the control flow returns to the step 3. When the cassette is still loaded in the mechanism, the control flows from the step 4 to the step 6 where the motor is rotated at a constant speed in the reversed direction. The direction of the constant speed transport of the tape is reversed every time that the control flow passes through a loop of the steps 3, 4, 6, 7, 8 (or 9), 10 and 11.

The control in the constant speed transport mode flows as described above. When the mechanism is not in the constant speed transport mode, or when the operation lever 104 is not at the central position in the step 7 (NO), the control flow shifts to a step 12. The step 12 judges if the operation lever 104 is located at the reverse position or not. The judgement is made on the basis of the information representing a connecting state of the switch 106 and the polarity of the power supply to the motor 102. The information may be obtained from a connecting state of a switch 124 to be described later. When the operation lever 104 is at the reverse position (YES), i.e. in a state to give a command of the rewind (REW), the control flow advances to a step 13. At this time, a pinch roller 112 departs from a capstan 114, interlocking with the operation lever 104. In the step 13, it is judged whether a state of the mechanism immediately after the judgement of the step 12 is made is in the REW mode or not. Immediately after the steps 7 and 12, the mechanism is not yet in the REW mode (NO), so that the control flows to a step 14.

In the step 14, the motor 102 is temporarily stopped and the control shifts to a step 15. The reason why the motor 102 is stopped in the step 14 is the same as that in the step 10. In the step 15, the polarity of the power supplied to the motor 102 is reversed and the control flows to a step 16. In the step 16, the rotation speed of the motor 102 is maximized. The speed-up of the motor may be realized by electrically shutting off a feedback path for the speed control by an electronic governor or a servo system, for example. When the operation enters upon the REW mode in the step 16, a step 17 checks whether the tape end is detected or not. The check is the same as that in the step 9. When the tape end is not found (NO), the control flows back to the step 12. When the operation lever 104 points to the reverse position, the control flows to the step 13. At this time, the mechanism has already entered upon the REW mode (YES). Accordingly, the control jumps to the step 16. The steps 12, 13, 16 and 17 form one loop to continue the REW mode.

In the step 12, when the operation lever 104 does not point to the reverse position (NO), the flow of the control shifts to a step 18.

In the step 18, it is judged if the REW operation has been made or not. If the REW operation has been made (YES), a step 19 temporarily stops the motor 102 and a step 20 reverses the polarity of the power supplied to the motor 102. Then, the control flow advances to a step 21. If the operation before the step 18 has not experienced the REW operation (NO), the control flow jumps to the step 21.

The step 21 judges as in the step 12. When the operation lever 104 is set to the forward position, the control flows to a step 22. At this time, the pinch roller 112 departs from the capstan 114 as in the REW operation mode. The step 22 does not reverse the polarity of power supplied to the motor 102, but maximizes only the speed of the motor 102. In the step 22, the operation enters upon a fast forward (FF) mode and it advances to the step 17. The steps 12, 18, 21, 22 and 17 form one loop to continue the FF mode.

When the tape end is detected in the step 17 (YES), a step 23 is executed in which the motor 102 is temporarily stopped. Then, a step 24 is executed. In the step 24, the polarity of the power supplied to the motor 102 is reversed, and then the flow advances to a step 25. In the step 25, the operation lever 104 is returned to the central position as shown in FIG. 1, and the control flows back to the step 3. When the step 21 judges that the operation lever is not set to the forward position (NO), the control also flows back to the same step 3. When the judgements in both the steps 12 and 21 are NO, the operation lever 140 is located at the central position.

Through the steps 3 through 25, the tape transport mechanism is controlled. When the cassette 100 is ejected from the mechanism, the step 3 judges that the cassette is not loaded (NO) and the control shifts to a step 26. In the step 26, the power source for the overall apparatus is turned off and the control flow is completed.

When the tape transport direction is reversed in the steps 11, 15, 20 and 24, the plunger 116 shown in FIG. 1 is temporarily fed with current. Every time current is fed to the plunger 116, it causes either of a head 118 or 120 corresponding to the tape transport direction to make contact with a magnetic surface of the tape. The head in contact with the tape may be known by a contact selection state of a switch 122 interlocked with a switching mechanism of those heads. The contact selection state of the switch 122 may be used for displaying a channel (CH 1 or CH 2) in which the tape is running. The tape transport mechanism shown in FIG. 1 is also provided with the aforementioned switch 124 switched in accordance with a contact state of the head 118 or 120 with the tape. By the switch 124, the polarity of the power to the motor 102 is switched so as to correspond to the tape transport direction.

FIGS. 3 through 14 show an example of the logic control circuit for realizing the control shown in FIG. 2. Logic control circuit, control timings are obtained without using clock signals. Signal processing states within the circuit are changed by using changes of external signals coupled with the circuit and signals within the circuit per se, in place of the clock signals.

Figure 3:
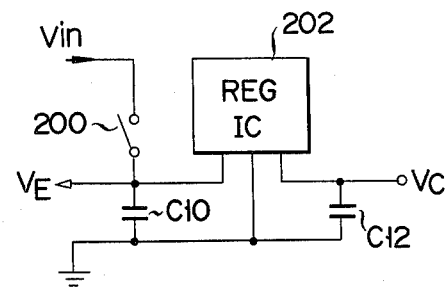
FIG. 3 shows a circuit diagram of a power source circuit.

FIG. 3 shows a power source circuit. An input voltage Vin of 12 V supplied from an automobile battery is applied to a conventional three-terminal type power source regulator IC 202, through a power source switch 200 mechanically coupled with the tape transport mechanism. When a cassette is loaded into the mechanism, the switch 200 is turned on. The judgement in the step 3 in FIG. 2 may be made through the ON/OFF state of the switch 200. The input voltage Vin is converted into a regulated stable DC power source voltage VC of 5 V, for example. The regulator IC 202 is coupled at the input and output terminals with filter capacitors C10 and C12. A non-regulated power source voltage VE of 12 V is taken out from the capacitor C10 side while the regulated power source voltage VC of 5 V is taken out from the capacitor C12 side.

Figure 4:
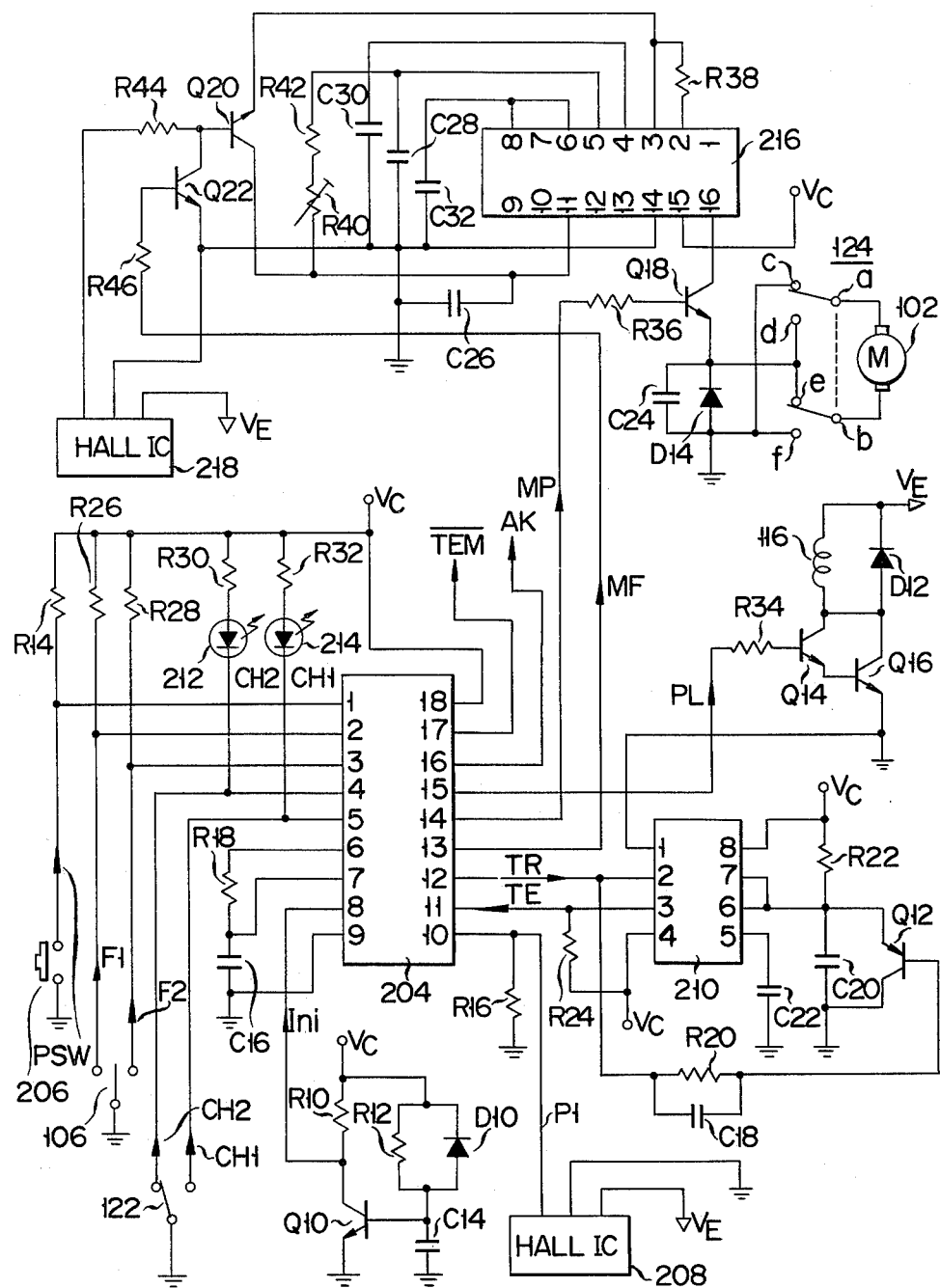
FIG. 4 shows a circuit diagram of a logic control apparatus according to the invention.

In FIG. 4, the voltage VC is applied to the collector of an NPN transistor Q10, through a resistor R10. The voltage VC is applied to the base of the transistor Q10, through a resistor R12. The base of the transistor Q10, together with the emitter, is grounded through the capacitor C14. A diode D10 is connected in parallel with the resistor R12, with the anode directed toward the transistor Q10. With the provision of the diode D10, a charging time constant of the capacitor C14 when the power source is turned on may be made large. Additionally, a discharge time constant of the capacitor C14 when the power source is turned off may be made small. At the collector of the transistor Q10, the initializing pulse Ini appears for an extremely short time immediately after the power source is turned on. The pulse width of the pulse Ini may be properly set by selecting properly the time constant of the resistor R12 and the capacitor C14.

The initializing pulse Ini is applied to a pin 8 of a logic control IC 204 in which the logic control circuit according to the invention is integrated. The control IC 204 was developed by the applicant of the present patent application and will be described later. The control IC 204 is comprised of five fundamental flip-flops FF1 to FF5 which are cleared or preset by the initializing pulse Ini. The clear or preset of the flip-flops is performed at logical level "0" and are clocked at the rise of the logical level from logical "0" to "1". The details of the control IC 204 using the flip-flops FF1 to FF5 is illustrated in FIGS. 5 to 13.

Figure 5:
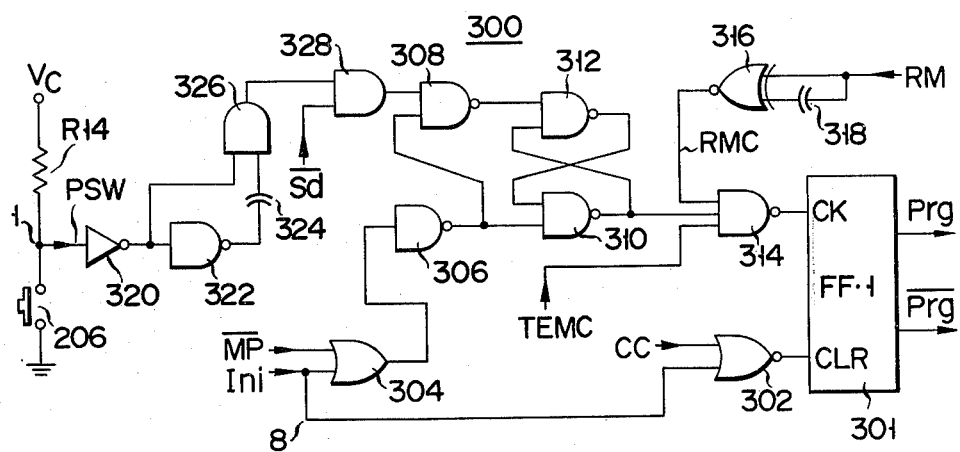
FIGS. 5 to 13 show logic circuit diagrams of the internal constructions of respective portions of a logic control integrated circuit (IC 204) of FIG. 4 which is essential to the invention.

FIG. 5 shows a logic circuit 300 including the first flip-flop (FF1) 301 and its associated circuitry. The initializing pulse Ini is applied to a NOR gate 302 through the first input terminal thereof where it is converted into a signal with logical "0". The logical "0" pulse is applied to the clear terminal of the flip-flop 301. In this way, the flip-flop 301 is cleared by the pulse of logical "0". At this time, the logical levels of the output signals Prg and $\overline{Prg}$ from the flip-flop 301 are "0" and "1", respectively. The pulse Ini is also applied to a NAND gate 306, by way of the first input terminal of an OR gate 304. In this example, the NAND gate 306 is used as a mere inverter. The output of the NAND gate 306 is applied to the first terminals of NAND gates 308 and 310. The outputs of the NAND gates 310 and 308 are applied to the first and second input terminals of a NAND gate 312, respectively. The output of the NAND gate 312 is applied to the second input terminal of the NAND gate 310. The output of the NAND gate 310 is applied to the clock terminal of the flip-flop 301, through the second input terminal of a NAND gate 314.

When the pulse Ini is logical "1", the output of the NAND gate 306 is logical "0", so that the output of the NAND gate 310 is logical "1". When the logical levels at the first and third input terminals of the NAND gate 314 are both "1", the output of the NAND gate 314 is logical "0" and the flip-flop 301 is not clocked. Immediately after the power source is turned on, the logical level of the pulse Ini returns to logical "0". Accordingly, if the second input terminal of the NOR gate 302 is logical "0", the output of the NOR gate 302 is logical "1". In other words, upon disappearing (or turning to logical "0") of the pulse Ini, the clear or the flip-flop 301 is released. The clear operation of the flip-flop 301 after the pulse Ini disappears is performed on the basis of the logic level of a pulse CC applied to the second terminal of the NOR gate 302. The clock operation of the flip-flop 301 is performed on the basis of any one of three input logic levels of the NAND gate 314.

A pulse TEMC is applied to the first input terminal of the NAND gate 314, and an output pulse RMC of an exclusive NOR gate (EXNOR gate) 316 is applied to the third terminal thereof. A signal RM is applied to the first input terminal of the EXNOR gate 316, and to the second input terminal of the EXNOR gate 316, through a delay circuit 318. The delay circuit 318 may be constructed by a CR integration circuit, for example. The pulse RMC is obtained at a logical level changing point of the signal RM by the combination of the EXNOR gate 316 and the delay circuit 318. Thus, the pulse RMC becomes a pulse appearing immediately after the signal RM changes from logical "0" to "1" and vice versa. The pulse width of the pulse corresponds to a delay time in the delay circuit 318.

Returning to FIG. 4, the voltage VC is applied to a pin 1 of the control IC 204, through a resistor R14. The pin 1 is grounded through the program switch 206. The switch 206 indicates a PSW used in the step 8 in FIG. 2. The logical level of the signal PSW applied to the pin 1 is "0" only when the switch 206 is turned on. The signal PSW is inputted to an inverter 320 in FIG. 5.

The output of the inverter 320 is applied to the first input terminal of an AND gate 326, through a NAND gate 322 and a delay circuit 324. The output of the inverter 320 is directly applied to the second input terminal of the AND gate 326. The output of the AND gate 326 is applied to the second input terminal of an AND gate 328. A signal $\overline{Sd}$ of logical "1" is aplied to the first input terminal of the AND 328 when the operation lever 104 is at the central position, as shown in FIG. 1. The judgement in the step 7 in FIG. 2 may be formed on the basis of the signal $\overline{Sd}$ or a signal Sd which is an inversion of the signal $\overline{Sd}$. The logical level of the signal Sd is determined on a contact selection state of the switch 106, as will be described later. The output of the AND gate 328 is applied to the second input terminal of the NAND gate 308.

The NAND gate 322, the delay circuit 324 and the AND gate 326 cooperate to form a sort of a differential circuit. Immerdiately after the program switch 206 is turned on, the first and second input terminals of the AND gate 326 are both logical "1", so that the output of the gate 326 remains with logical "1". At this time, the output of the NAND gate 322 has been logical "0". The logical level "0" is delayed by the delay circuit 324 by a given time, and is transferred to the first terminal of the AND gate 326. When the first terminal is logical "0", the output of the AND gate 326 becomes again logical "0". Specifically, when the program switch 206 is turned on and logical "0" is inputted to the inverter 320, the PSW pulse signal with a width corresponding to a delay time given by the delay circuit 324 is applied to the second input terminal of the AND gate 328. At this time, if the operation lever 104 is at the central position, the signal $\overline{Sd}$ is logical "1". When the PSW pulse signal appears, the output of the AND gate 328 logical "1".

A signal $\overline{MP}$ is applied to the second input terminal of the OR gate 304. The signal $\overline{MP}$ is logical "0" when the motor 102 in FIG. 1 is fed with current. When the pulse Ini and the signal $\overline{MP}$ are both logical "0", the output of the NAND gate 306 is logical "1". Under this condition, when the output of the AND gate 328 is logical "1", the output of the NAND gate 308 becomes logical "0". Then, the output logical level of the NAND gate 310 changes from "1" to "0". At this time, if the first and third input terminals of the NAND gate 314 are both logical "1", the output logical level of the NAND gate 314 changes from "0" to "1". Upon the change of the logical level, the flip-flop 301 is clocked and the output signals Prg and $\overline{Prg}$ are logical "1" and "0", respectively.

As described above, the flip-flop 301 is clocked in such a way that, after the power source is turned on (Ini="0"), current is fed to the motor 102 ($\overline{MP}$="0"), and the operation lever 104 is at the central position or the constant speed transport position ($\overline{Sd}$="1"), the pulses RMC and TEMC are both logical "1", and under this condition the program switch 206 is turned on.

When the signal $\overline{Sd}$ is logical "0", the output logical level of the AND gate 328 is always "0" irrespective of an ON/OFF state of the program switch 206. When the operation lever 104 is at the FF mode or REW mode commanding positions ($\overline{Sd}$="0"), the flip-flop 301 is never clocked by the turn-on of the program switch 206. When a mechanism to prevent the program switch 206 from being depressed in the FF and REW modes is provided additionally, or when the circuit is so designed that there is no problem when the flip-flop 301 is clocked in the FF and REW modes, the AND gate 328 may be omitted. The flip-flop 301 may also be clocked by the pulse RMC (logical level "1"→"0") when the power supply to the motor 102 is interrupted ($\overline{MP}$="1") and the pulse TEMC is logical "1" or the pulse TEMC (logical "1"→"0") when the power supply to the motor 102 is interrupted and the pulse RMC is logical 37 1".

Returning to FIG. 4 again, an output pulse P1 of a tape end detecting Hall IC 208 is applied to a pin 10. The pin 10 is grounded through a resistor R16 and the Hall IC 208 is biased by the voltage VE. The Hall IC 208 is located at a proper position in the tape transport mechanism shown in FIG. 1, in order to detect a magnetic flux generated by a magnet (not shown) rotated interlocked with the reel shaft 108 or 110 shown in FIG. 1. A change of the flux caused by the rotation of the reel shaft 108 or 110 is detected by the Hall IC 208 to provide a pulse P1 with a frequency proportional to the rotating speed of the reel shaft. Such pulse P1 is applied to the pin 10 of the control IC 204. The output pulse P1 of the Hall IC 208 may be applied to an electronic type tape counter. The pulse P1 is inputted to an inverter 420 shown in FIG. 6.

Figure 6:
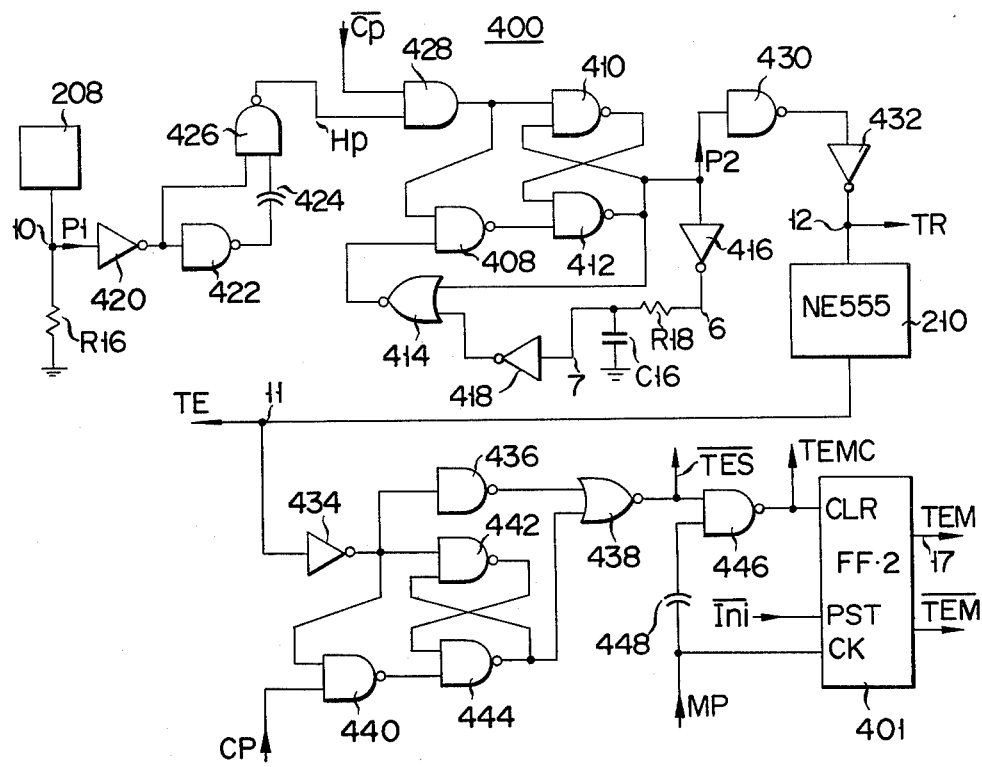

FIG. 6 shows a logic circuit 400 including the second flip-flop 401(FF2) and its associated circuitry. The pulse level-inverted by the inverter 420 is applied through a NAND gate 422 and a delay circuit 424 to the first input terminal of a NAND gate 426. The output of the inverter 420 is directly applied to the second input terminal of the NAND gate 426. The inverter 420, the NAND gates 422 and 426, and the delay circuit 424 correspond to the logic differential circuit including the components 320 to 326 referred to in FIG. 5. More specifically, a pulse HP, which exhibits logical "0" at the leading edge of the pulse P1, appears at the output terminal of the NAND gate 426. The pulse HP is applied to the first input terminal of an AND gate 428. The second input terminal of the AND gate 428 is supplied with a pulse $\overline{CP}$ which exhibits logical "0" when power is supplied to the motor 102. The output of the NAND gate 428 is applied to the second input terminal of NAND gates 408 and 410. The outputs of the NAND gates 408 and 410 are coupled with the first and second input terminals of a NAND gate 412, respectively.

The output of the NAND gate 412 is applied to the first input terminal of the NAND gate 410, the first input terminal of a NOR gate 414, and an inverter 416. The output of the inverter 416 is inputted to an inverter 418 through a resistor R18. The input terminal of the inverter 418 is grounded through a capacitor C16. The resistor R18 and the capacitor C16 form a signal delay circuit and is externally connected to pins 6 and 7 of the control IC 204. The output of the inverter 418 is applied to the second input terminal of the NOR gate 414 and the output of the NOR gate 414 is applied to the first input terminal of the NAND gate 408. When the pulse $\overline{CP}$ is logical "1", the NAND gate 412 produces a pulse P2 with a widened pulse width which is coincident with the trailing edge of the pulse HP and has a logical level "0". The pulse width is adjustable by properly selecting the time constant of the resistor R18 and the capacitor C16. The pulse P2 becomes a trigger pulse TR, through a NAND gate 430 and an inverter 432. In this case, the inverter 432 is used as a buffer circuit.

In FIG. 4, the trigger pulse TR is produced from a pin 12 of the control IC 204 and is inputted into a pin 2 of a tape end detecting IC 210. The pulse TR is also applied to the base of a PNP transistor Q12, through a parallel circuit of a resistor R20 and a capacitor C18. The collector of the transistor Q12 is grounded and the emitter thereof is connected to pins 6 and 7 of the IC 210. The pins 6 and 7 are connected through a capacitor C20 to ground. The voltage VC is applied to those pins through a resistor R22. A pin 5 of the IC 210 is grounded through a capacitor C22 and a pin 1 thereof is directly grounded. The voltage VC is applied to pins 4 and 8 thereof and is applied to a pin 3 through a resistor R24. Model NE555 manufactured by Texas instrument Inc. in the USA, for example, may be used for the IC 210. The peripheral circuit of the IC 210 shown in FIG. 4 is the substantially the same as a typical application (MISSING-PULSE DETECTOR) disclosed in a catalogue of the same company. Accordingly, the details of the construction and the operation of the IC 210 will not be given but description will be given only about the role of the IC 210 in the circuit shown in FIG. 4.

The tape end detecting IC 210 is triggered in succession at the trailing edge of a pulse train of the trigger pulse TR with periods corresponding to the rotation speed of the reel shaft 108 or 110. When the pulse interval of the trigger pulse TR is narrower than a given timing interval, that is, when the reel shaft is rotating, the logic level of an output pulse signal TE derived from the pin 3 is logical "1". When the tape end is detected and the rotation of the reel shaft is stopped, the pulse width of the trigger pulse TR is wider than the given timing interval. As a result, the logic level of the pulse TE becomes "0". The pulse TE continues logical level "0" until the IC 210 is retriggered at the trailing edge of the trigger pulse, again. The pulse TE is inputted to an inverter 434 shown in FIG. 6, through a pin 11 of the control IC 204.

The output of the inverter 434 is applied to the second input terminal of a NOR gate 438, by way of a NAND gate 436, and to the second input terminals of NAND gates 440 and 442. The outputs of the NAND gates 440 and 442 are applied to the first and second input terminals of a NAND gate 444. The output of the NAND gate 444 is applied to the first input terminals of the NOR gate 438 and the NAND gate 442. An output pulse $\overline{TES}$ of the NOR gate 438 is applied to the second input terminal of a NAND gate 446. The output pulse TEMC of the NAND gate 446 is applied to the clear terminal of the flip-flop 401. The pulse TEMC occurs only when a tape end condition to be given later holds ($\overline{TES}$="1" and MP="1"). The flip-flop 401 is preset by the logical level "0" of a pulse Ini which is an inversion of the initializing pulse $\overline{Ini}$. Upon the preset, the logical levels of output signals TEM and $\overline{TEM}$ from the flip-flop 401 are "1" and "0", respectively. The flip-flop 401 is clocked at the leading edge of a signal MP which becomes logical "1" when power is supplied to the motor 102. After this, the signals TEM and $\overline{TEM}$ become logical "0" and "1". The signal MP is applied to the first input terminal of the NAND gate 446, through a delay circuit 448.

The reason why the flip-flop 401 is provided will be described. The judgement as to the tape end in the step 9 or 17 may be performed on the basis of the power supply state of the motor 102 and the stoppage of the reel shaft 108 or 110. More specifically, the tape end may be detected depending on the logical level "0" of the pulse TE (TE="0") produced at the stoppage of the reel shaft and the logical level "1" of the signal MP (MP="1") when power is supplied to the motor. However, when the tape end is detected, the logical level of the signal MP immediately becomes "0" (MP="0") in order to temporarily stop the motor in the step 10 or 23. If so, the condition for indicating the tape end, (TE="0" and MP="1"), is destroyed, so that the control flow can not advance to the step 10 or 23 and the succeeding ones. Accordingly, if the condition for indicating the tape end once holds, the tape end condition must be held until the process in the steps 10 and 11 or the steps 23 to 25 is completed. The reason why the flip-flop 401 is provided is to hold or memorize the tape end condition.

As described above, when the rotation of the reel shaft stops, the logic level of the pulse TE becomes "0". At this time, a pulse CP applied to the first input terminal of the NAND gate 440 is logical "0". As a result, the output of the inverter 434 is logical "1" and the output of the NAND gate 436 is logical "0", and the output of the NOR gate 438 is logical "1". If the power is has been applied to the motor at this time, the first input terminal of the NAND gate 446 is logical "1". Accordingly, if the pulse TE becomes logical "0", the output pulse TEMC of the NAND gate 446 becomes logical "0". As a result, the flip-flop 401 is cleared and the logical levels of the outputs TEM and $\overline{TEM}$ become "0" and "1". In this way, during a period that the flip-flop 401 is in a clear state, the motor 102 is stopped, the plunger 116 is driven and the polarity of the power supply to the motor 102 is switched.

In this way, the process after the tape end is detected, the logical level of the signal MP is "1", so that power is supplied to the motor 102 and the flip-flop 401 is clocked. Actually, there is a slight time lag from the power supply to the motor 102 till the reel shaft rotates. For this, the tape end condition (TE="0" and MP="1"), may hold immediately after power is supplied to the motor, and there is a great possibility that the control can not flow to the next step. Such an erroneous holding of the condition, however, may be prevented by setting TE to "1" as MP="1". The pulse CP applied to the second input terminal of the AND gate 428 is used to this end. As will subsequently be described, the signal MP is set to logical "1" at the leading edge of a pulse CP. Accordingly, when the logical level of a pulse $\overline{CP}$ as an inversion of the pulse CP is "0", MP="1" is obtained. $\overline{CP}$="0" is equivalent to logical "0" of the pulse HP for the AND gate 428 operation. That is, the tape end detecting IC 210 is triggered by the $\overline{CP}$="0" to obtain TE="1". In this case, the state of TE="1" continues for a time period corresponding to the time constant C20·R22 proper to the IC 210. During this period of time, if the reel shaft rotates, a pulse train of the pulse HP is produced and TE="1" holds.

Also after the output signal is produced from the IC 210, the tape end condition erroneously holds. As the pulses CP and $\overline{CP}$ are produced, MP="1" holds before TE="1" holds, so that the condition, (TE="0", MP="1"), erroneously holds for an instant period. This arises from the fact that an operation that the pulse TE becomes logical "1" upon the triggering of the IC 210 is slower than the operation of the flip-flop 801 to provide a logical state of MP="1". Thus, when the tape end is detected depending on the condition of (TE="0", MP="1"), an erroneous operation tends to occur. To avoid this problem, the tape end is detected by using a new condition ($\overline{TES}$="1", MP="1") at the input of the NAND gate 446. Specifically, when TE="1"→"0", $\overline{TES}$="0"→"1". In a state of TE="0", if the pulse CP is applied to the first input terminal of the NAND gate 440 (CP="1"), the $\overline{TES}$ having the shift of a logical state $\overline{TES}$="1"→"0" is used without waiting the shift of a logical state TE="0"→"1". The signal MP applied to the first input terminal of the NAND gate 446 passes through the delay circuit 448. For this, the logical level of the pulse $\overline{TES}$ applied to the second input terminal of the NAND gate 446 is set to "0" more quickly than the first input terminal of the NAND gate 446 becomes logical "1" with CP="1". Therefore, it is perfectly prevented that the tape end condition, ($\overline{TES}$="1", MP="1"), erroneously holds at the NAND gate 446 after the tape end is detected. In this way, after the tape end is detected, the control sequence of the step 10 or the step 23 and the succeeding ones shown in FIG. 2 is performed correctly.

Returning again to FIG. 4, pins 2 and 3 of the control IC 204 are supplied with the voltage VC, through resistors R26 and R28. Those pins 2 and 3 are connected to a first contact (F1) and a second contact (F2) of the switch 106, respectively. The switch 106 takes three states. When the operation lever 106 is at the central position as shown in FIG. 1, the first and second contacts contact nothing. In this case, signals F1 and F2 at the pins 2 and 3 of the control IC 204 are both logical "1". Let us consider a case where a tape is being transporting in the direction of the channel 1. When the pin 2 of the IC 204 is grounded through the first contact of the switch 106, the logical level of the signal F1 at the pin 2 is "0". This corresponds to the FF operation mode in the channel 1. When the pin 3 of the IC 204 is grounded through the second contact of the switch 106, the logical level of the signal F2 at the pin 3 becomes "0". This corresponds to the REW operation mode in the channel 1. This operation may be correspondingly applied for the tape transport direction of the channel 2. F1="0" corresponds to the REW operation mode of the channel 2 and F2="0" corresponds to the FF operation mode in the channel 2.

The voltage VC is applied through a resistor R30 and a light emitting diode LED 212 to the pin 4 of the control IC 204 and to the pin 5 through a resistor R32 and a LED 214. The pins 5 and 4 are connected to the first contact (CH1) and the second contact (CH2) of the switch 122. When the tape is being transported in the channel 1 direction, the pin 5 of the IC 204 is grounded through the first contact of the switch 122. In this case, the logical levels of signals CH1 and CH2 at the pins 5 and 4 are "0" and "1", respectively. When the tape is running in the channel 2 direction, the pin 4 of the IC 204 is grounded through the second contact of the switch 122. In this case, the logical levels of the signals CH1 and CH2 are "1" and "0", respectively.

The tape transport direction and the presence or not of the FF mode or the REW mode may be checked by using the combination of the signals F1 and F2 and the signals CH1 and CH2. Exactly, (F1="1", F2="1") corresponds to YES in the step 7 in FIG. 2. (F1="0", F2="1") or (F1="1", F2="0") corresponds to NO. (CH1="0", F1="1", F2="0") or (CH2="0", F1="0", F2="1") corresponds to YES in the step 12. (CH1="0", F1="0", F2="1") or (CH2="0", F1="1", F2="0") correspond to NO in the step 12 and YES in the step 21. Further, when (CH1=F1="0") or (CH2=F2="0") representing a condition that the operation lever 104 is at the forward position, or (F1="0") or (F2="0") representing a condition that the operation lever 104 is not at the central position, does not hold, it corresponds to NO in the step 21.

Figure 7:
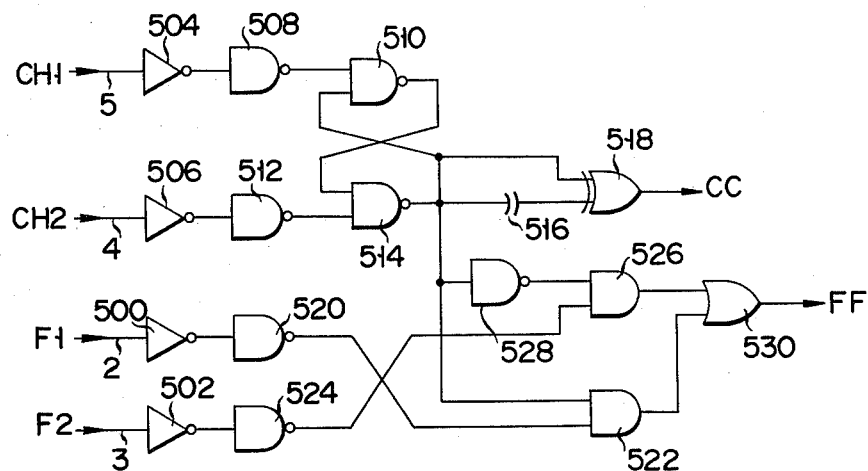

The signals F1 and F2 at the pins 2 and 3 of the control IC 204 are inputted to inverters 500 and 502 shown in FIG. 7, respectively. The signals CH1 and CH2 at the pins 5 and 4 of the IC 204 are inputted to inverters 504 and 506, respectively. The output of the inverter 504 is applied to the second input terminal of a NAND gate 510, through a NAND gate 508. The output signal of the inverter 506 is applied through a NAND gate 512 to the first input terminal of a NAND gate 514. The output signal of the NAND gate 510 is applied to the second input terminal of the NAND gate 514 and the output signal from the NAND gate 514 is applied to the first input terminal of the NAND gate 510. The output of the NAND gate 514 is applied to the first input terminal of an exclusive OR gate (EXOR gate) 518, through a delay circuit 516. The output signal of the NAND gate 514 is directly applied to the second input terminal of the EXOR gate 518. The EXOR gate 518 produces the pulse CC which becomes logical "1" at an instant that the logical levels of the signals CH1 and CH2 are inverted, that is, the switch 122 is switched. The pulse CC has already been described as the pulse inputted to the NOR gate 302 in FIG. 5.

The output of the inverter 500 is applied to the first input terminal of an AND gate 522, through a NAND gate 520. The output of the inverter 502 is transferred to the first input terminal of an AND gate 526, through a NAND gate 524. To the second input terminal of the AND gate 526, the output of the NAND gate 514 is applied through a NAND gate 528. The output of the NAND gate 514 is applied to the second input terminal of the AND gate 522. The outputs of the AND gates 522 and 526 are applied to the first and second input terminals of an OR gate 530, respectively. The OR gate 530 produces a signal FF which is logical "0" only when the operation is in the REW mode, i.e. (CH1="0", CH2="1", F1="1", F2="0") or (CH1="1", CH2="0", F1="0", F2="1"). The judgement in the step 13 of FIG. 2 may be made depending on the logical level of the signal FF.

Figure 8:
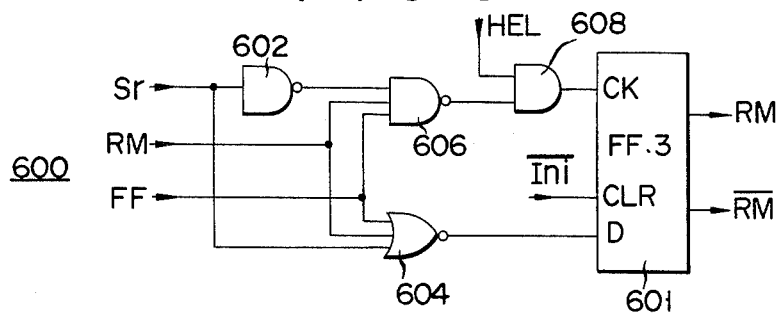

FIG. 8 shows a logic circuit 600 including the third flip-flop (FF3) 601 and its associated circuitry. A D-type flip-flop 601 is cleared by the pulse $\overline{\text{Ini}}$ when the power source switch 200 in FIG. 3 is turned on. Upon the clearing of the flip-flop, the output RM of the flip-flop 601 becomes logical "0". At this time, if a contact state of the switch 122 is CH1="0", the motor 102 is rotated forward (step 6). On the other hand, when CH2="0", the motor 102 is rotated in the reverse direction to that when CH1="0". However, the rotational direction when CH2="0" may be considered as the forward rotation for the channel 2.

The rotational direction of the motor 102 depends on a contact state of the switch 124. A signal Sr is applied to the first input terminals of a NAND gate 602 and a NOR gate 604. The signal Sr becomes logical "1" when a signal $\overline{\text{Sd}}$ as an inversion of the signal Sd applied to the AND gate 328 or the output signal TEM of the flip-flop 401 is logical "0". The output of the NAND gate 602 is applied to the third input terminal of a NAND gate 606. The output signal RM of the flip-flop 601 is applied to the second input terminals of the NAND gate 606 and the NOR gate 604. The OR gate 530 of FIG. 7 applies the signal FF to the third input terminal of the NOR gate 604 and the first input terminal of the NAND gate 606. The output of the NOR gate 604 is applied to a D-input of the flip-flop 601. The output of the NAND gate 606 is applied to a clock terminal of the flip-flop 601, through the first input terminal of an AND gate 608. A signal HEL is applied to the second input terminal of the AND gate 608. The signal HEL rises to logical "1" when the signals MP and the pulse TE are both logical "0" and falls to logical "0" when they become logical "1".

The flip-flop 601 operates when the operation enters upon the REW mode and when the REW mode is released. When the constant speed transport mode or the FF mode shifts to the REW mode (step 15), if the flip-flop 601 is clocked by the signal HEL in a logical state of "1" at the D-input terminal, the output signal RM of the flip-flop 601 becomes logical "1". When the REW mode shifts to the constant speed transport mode or the FF mode (step 20), or when the REW mode shifts to the tape end detecting mode (step 24), the signal FF or Sr becomes logical "1" and the D terminal becomes logical "0". At this time, clocked by the signal HEL, the output signal RM of the flip-flop 601 returns to logical "0". In any case, the signal HEL is used for clocking the flip-flop 601. The write of data "1" into the flip-flop 601, that is, obtaining a state RM="1", is performed only when the operation enters upon the REW operation. This is realized in a manner that the logical level at the D-input terminal of the flip-flop 601 is rendered to "1" only when $Sr=RM=FF=$ "0" by means of the NOR gate 604.

When $\overline{Sr}=FF=RM=$ "1", i.e. the output of the NAND gate 606 is logical "0", the flip-flop 601 is not clocked by the signal HEL. When the constant speed transport mode shifts to the REW mode, $MP=TE=$ "0" holds. By this logical state, $RM=$ "1" is loaded into the flip-flop 601. Following this, when the direction of the tape transport changes, FF="1". Under this logical state, when the signal HEL clocks the flip-flop 601 without being inhibited when $\overline{Sr}=FF=RM=$ "1", the following problem may arise: the logical level at the D-input terminal returns to "0" immediately after $RM=$ "1" is loaded and $RM=$ "1" returns to $RM=$ "0". It is for this reason that the AND gate 608 is provided. Such a problem, i.e. that $RM=$ "1" returns to $RM=$ "0", never occurs so long as a D-type flip-flop operates in compliance with its theoretical logic. In this case, the flip-flop 601 may be directly clocked by the signal HEL the NAND gates 602 and 606, and the AND gate 608 may be omitted.

Figure 9:
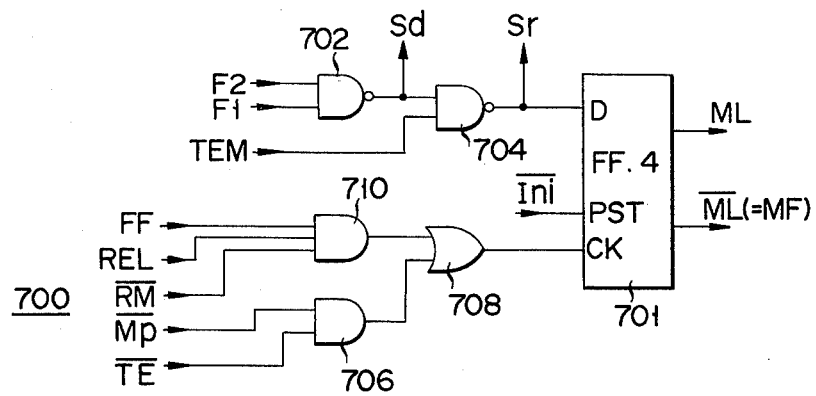

FIG. 9 shows a logic circuit 700 including the 4th flip-flop (FF4) 701 and its associated circuitry. The D-type flip-flop 701 is preset by the pulse $\overline{Ini}$. Upon the presetting, the logical levels of output signals ML and $\overline{ML}$ of the flip-flop 701 are "1" and "0", respectively. The signal $\overline{ML}$ is used to command a high speed rotation of the motor 102 for the FF mode or the REW mode. The signals F1 and F2 are applied to the first and second input terminals of a NAND gate 702, respectively. The NAND gate 702 produces the signal Sd which in turn is applied to the second input terminal of a NAND gate 704. The output TEM of the flip-flop 401 is applied to the first input terminal of the NAND gate 704. The output signal Sr of the NAND gate 704 is applied to the D-input terminal of the flip-flop 701. The signal Sr has been described relating to FIG. 8.

Signals $\overline{TE}$ and $\overline{MP}$ are applied to the first and second input terminals of an AND gate 706. When the power supply to the motor 102 is stopped ($\overline{MP}=$ "1") and the tape end is detected ($\overline{TE}=$ "1"), the output of the AND gate 706 becomes logical "1". The output of the AND gate 706 is applied through the first input terminal of an OR gate 708 to a clock terminal of the flip-flop 701. An output signal $\overline{RM}$ of the flip-flop 601 and signals REL, FF are applied to the first, second and third input terminals of an AND gate 710. How to form the signal REL will be described later. The signal REL becomes logical "1" at an instant that a contact of the switch 106 contacts the first contact (F1) or the second contact (F2) or detaches therefrom. The output of the AND gate 710 is transferred to the second input terminal of the OR gate 708.

The flip-flop 701 operates when the motor speed is changed. When the output signals ML and $\overline{ML}$ of the flip-flop 701 are logical "1" and "0", the motor 102 rotates at a constant speed (step 6). When the signals ML and $\overline{ML}$ are logical "0" and "1", the signal MF ($=\overline{ML}$) is logical "1" to rotate the motor 102 at a high speed (step 16 or step 22). Data is loaded into the flip-flop 701 in the following cases: the first case is that a command to shift the operation from the constant speed mode to the FF operation is issued (YES in the step 21) or the operation returns from the FF mode to the constant speed transport (NO in the step 21); the second case is that a command to shift the operation from the constant speed mode to the REW mode is issued (YES in the step 12) or the operation returns from the REW to the constant speed mode; and the third case is that the tape end is detected in the FF mode or the REW mode (YES in the step 17). In the first case, the flip-flop 701 is clocked by the signal REL only when $FF=\overline{RM}=$ "1". When a command to shift the operation from the constant speed transport mode to the FF mode, for example, is issued, either of the signals F1 and F2 is logical "0", and accordingly, $Sd=$ "1". Accordingly, when $TEM=$ "1", the signal Sr applied to the D-input terminal of the flip-flop 701 is logical "0". Then, the output $\overline{ML}$ ($=MF$) of the flip-flop 701 is clocked to logical "1" by the signal REL, so that the motor 102 rotates with high speed. On the other hand, when the tape transport mode is returned from the FF mode to the constant speed mode, $Sd=$ "0" and $Sr=$ "1" are obtained. Thus, the D-input terminal of the flip-flop 701 is rendered to logical "1". At this time, the flip-flop 701 is clocked by the signal REL and the logic level of the output signal $\overline{ML}$ becomes "0", so that the motor 102 again rotates at the constant speed.

In the second case, when $\overline{MP}=\overline{TE}=$ "1" (step 14 or step 19), data corresponding to the logical level of the signal Sr is loaded into the flip-flop 701. When a command to shift the operation from the constant transport mode to the REW mode, is issued, $Sd=$ "1" and therefore when $TEM=$ "1", the signal Sr is logical "0". When clocked by $\overline{MP}=\overline{TE}=$ "1", the output signal $\overline{ML}$ of the flip-flop 701 becomes logical "1" to rotate the motor 102 at a high speed. When the REW mode is shifted to the constant speed transport mode, $Sd=$ "0" and $Sr=$ "1". At this time, since the D-input terminal of the flip-flop 701 is logical "1", when being clocked by $\overline{MP}=\overline{TE}=$ "1", the output signal $\overline{ML}$ of the flip-flop 701 is logical "0". As a result, the motor 102 rotates at a constant speed.

In the first case, only the rotation speed of the motor 102 is switched by the signal REL. In the second case, the logical states $\overline{MP}=\overline{TE}=$ "1" switches the speed and the direction of the rotation of the motor 102. As described above, the flip-flop 601 in FIG. 8 is clocked by signal HEL which rises when $MP=TE=$ "0" or $\overline{MP}=\overline{TE}=$ "1". When it is clocked by the signal HEL to $RM=$ "1", the polarity of the power supplied to the motor 102 is inverted and the rotation speed is maximized by $\overline{ML}=$ "1" (step 16). On the other hand, when it is clocked to $RM=$ "0" by the signal HEL, the polarity of the power supply is reversed (step 20) and the rotation speed is constant (step 6).

In the third case, when $TEM=$ "0" (YES in the step 17), the signal Sr is logical "1" and the data "1" is loaded by $\overline{MP}=\overline{TE}=$ "1". Upon this loading, the output signal $\overline{ML}$ of the flip-flop 701 becomes logical "0" and the rotation speed returns to the constant speed (step 6). At this time, as in the second case, $\overline{MP}=\overline{TE}=$ "1" reverses the power-supply polarity of the motor 102 (step 24).

Figure 10:
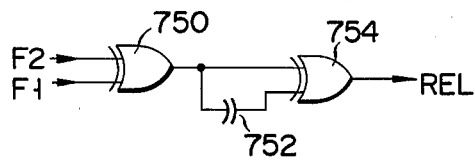

FIG. 10 shows a logic circuit for forming the pulse REL. The signals F1 and F2 are applied to the first and second input terinals of an EXOR gate 750. The output of the EXOR gate 750 is applied to the first input terminal of an EXOR gate 754 by way of a delay circuit 752 and the output of the EXOR gate 750 is applied to the second input terminal of the EXOR gate 754. The output signal of the EXOR gate 754 is used as the pulse REL. When the operation lever 104 is shifted from the central position to the FF or the REW position, one of the signals F1 or F2 is logical "0" while the other becomes logical "1". Accordingly, the output of the EXOR gate 750 becomes logical "1". Immediately after the output of the EXOR gate 750 becomes logical "1", the logical levels at the first and second input terminals of the EXOR gate 754 are "0" and "1", respectively, thereby to produce the pulse REL of logical "1". However, since the delay time of the delay circuit 752 is very short, the first and second input terminals of the EXOR gate 754 immediately become logical "1" and the pulse REL disappears. The pulse REL is a pulse of logical "1" occurring for a very short time immediately after the operation lever 104 is turned or moved.

Figure 11:
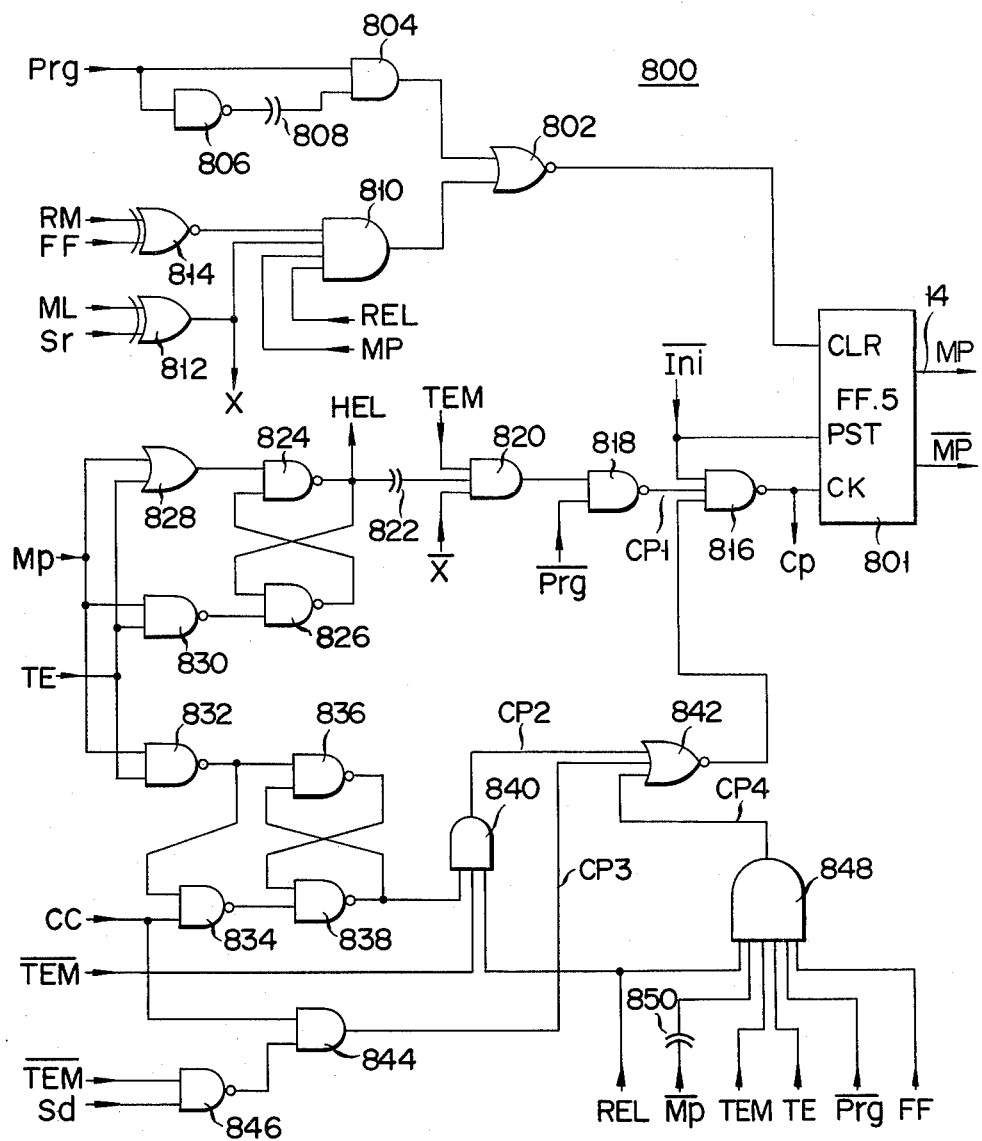

FIG. 11 shows a logic circuit 800 including the 5th flip-flop (FF5) 801. The flip-flop 801 is preset by the Ini so that the output signals MP and $\overline{MP}$ become logical "1" and "0". When MP="1", the motor 102 is supplied with power. The flip-flop 801 is cleared by an output signal of a NOR gate 802. The output signal Prg of the flip-flop 301 is applied to the second input terminal of the NOR gate 802 via the second input terminal of an AND gate 804. The signal Prg is applied to the first input terminal of the AND gate 804, through a NAND gate 806 and a delay circuit 808. Only for a very short time immediately after the signal Prg changes from logical "0" to "1", the second input terminal of the NOR gate 802 becomes logical "1" and the output of the NOR gate 802 becomes logical "0". Thus, the flip-flop 801 is cleared at the leading edge of the signal Prg.

The output of an AND gate 810 is applied to the first input terminal of the NOR gate 802. The signal REL and the signal MP are applied to the first and second input terminals of the AND gate 810. The outputs of an EXOR gate 812 and an EXNOR gate 814 are applied to the third and fourth input terminals of the AND gate 810. The signals Sr an ML are applied to the first and second input terminals of the EXOR gate 812. The signals FF and RM are transferred to the first and second input terminals of the EXNOR gate 814.

The flip-flop 801 must be cleared, that is, the logical level of the signal MP must be "0" in the following cases: the first case is that the program switch 206 is turned on at the time of the constant speed (YES in the step 8); the second case is that the tape end is detected (YES in the step 17); the third case is that a command to shift the operation from the constant speed mode to the REW mode is issued (NO in the step 13); and the fourth case is that a command to shift the operation from the REW mode to the constant speed mode is issued (YES in the step 18).

In the first and second cases, MP="0" is provided by the output pulse from the AND gate 804 produced at the leading edge of the output signal Prg of the flip-flop 301. In the third and fourth cases, if the output pulse of the AND gate 804 renders the pulse MP logical "0", i.e. MP="0", the following problem arises. Let us consider a case, for example, where, after the operation lever 104 is moved from the central position to the REW position, it is quickly returned to the central position before the reel shafts 108 and 110 stop their rotation. In such a case, if the logic circuit is so designed that the operation enters upon the REW mode and returns to the constant speed mode again, a tape recorder or a tape player with such a logic circuit is poor in operability. The reason for this is that, if the operation once enters the REW mode, the motor 102 must be stopped temporarily and therefore a few or several seconds is taken until the motor returns to the constant speed mode.

This problem may be solved by clearing the flip-flop 801 by the signal REL. However, this signal occurs in other cases than the third and fourth cases, for example, when the operation returns from the FF mode to the constant speed mode. Accordingly, it is necessary to clear the flip-flop 801 only for the third and fourth cases. This is realized by passing the signal REL through the AND gate 810 only when MP="1", RM=FF, and $\overline{ML}$ (=MF)=Sr. In those conditions, MP="1" implies that the motor 102 is supplied with power. The condition RM=FF holds when the operation lever 104 is moved to the REW mode although the operation is not in the REW mode actually (RM=FF="0"), or when the operation lever 104 is switched to the constant speed transport mode or the FF mode in an operation state of the REW mode (RM=FF="1"). The condition $\overline{ML}$=Sr holds when the motor rotation speed returns to a high speed to a constant speed (ML="1"→"0", Sr="0"→"1"), or when it shifts from a constant speed to a high speed ($\overline{ML}$="0"→"1", Sr="1"→"0").

The flip-flop 801 is clocked by the output pulse CP from a NAND gate 816. The pulse Ini is applied to the third input terminal of the NAND gate 816. An output pulse CP1 of a NAND gate 818 is applied to the second input terminal of the NAND gate 816. The output signal $\overline{Prg}$ from the flip-flop 301 is applied to the first input terminal of the NAND gate 818. The output of an AND gate 820 is applied to the second input terminal of the NAND gate 818. The output signal TEM of the flip-flop 401 is applied to the third input terminal of the AND gate 820. A signal $\overline{X}$ is applied to the first input terminal of the AND gate 820. The signal X is an inversion of an output signal $\overline{X}$ of the EXOR gate 812. The output signal HEL of a NAND gate 824 is applied through a delay circuit 822 to the second input terminal of the AND gate 820. The output of a NAND gate 826 is applied to the first input terminal of the NAND gate 824 and the output of the NAND gate 824 is applied to the second input terminal of the NAND gate 826. The output of an OR gate 828 is applied to the second input terminal of the NAND gate 824 and the output of a NAND gate 830 is applied to the first input terminal of the NAND gate 826. The output signal MP of the flip-flop 801 is applied to the second input terminals of the OR gate 828 and the NAND gate 830. The output signal TE of the tape end detecting IC 210 is applied to the first input terminals of the OR gate 828 and the NAND gate 830.

The signals MP and TE are applied to the second and first input terminals of a NAND gate 832, respectively. The output of the NAND gate 832 is applied to the second input terminals of NAND gates 834 and 836, respectively. The outputs of the NAND gates 834 and 836 are applied to the first and second input terminals of a NAND gate 838. The output of the NAND gate 838 is applied to the first input terminal of the NAND gate 836 and the third input terminal of an AND gate 840. An output pulse CP2 of the AND gate 840 is transferred through the third input terminal of a NOR gate 842 to the first input terminal of the NAND gate 816. The pulse CC is transferred from the EXOR 518 in FIG. 7 to the first input terminal of the NAND gate 834. The pulse CC is transferred as a pulse CP3 to the second input terminal of the NOR gate 842, through an AND gate 844. The output of a NAND gate 846 is applied to the first input terminal of the AND gate 844. The signal Sd is supplied from the NAND gate 702 in FIG. 9 to the first input terminal of the NAND gate 846. The output signal $\overline{\text{TEM}}$ of the flip-flop 401 is applied to the second input terminals of the NAND gate 846 and the AND gate 840.

The pulse REL is applied to the first input terminal of the AND gate 840. The pulse REL is applied to the sixth input terminal of an AND gate 848. The fifth input terminal of the AND gate 848 is supplied with the output signal $\overline{\text{MP}}$ of the flip-flop 801, through a delay circuit 850. The AND gate 848 receives at the fourth, third, second and first input terminals the signals TEM, TE, $\overline{\text{Prg}}$, and FF, respectively. An output pulse CP4 of the AND gate 848 is transferred to the first input terminal of the NOR gate 842.

The flip-flop 801 must be clocked to MP="1" after a prestage process for the operation following the process of MP="0" is completed. The prestage process has four cases: the first case is that the tape transport direction is reversed to produce the pulse CC (step 11, 15, 20 or 24); and the second case is that the tape end is detected in the FF operation mode or the REW operation mode (YES in step 17) and the operation lever 104 is returned to the central position by the current supply to the plunger 116 (step 25). In this case, the logic is so constructed that the flip-flop 801 is clocked at the pulse generation timing of either the pulse CC or the pulse REL which is generated later. The pulse CC is produced when the switch 122 is operated and the pulse REL is produced when the switch 106 is operated. The switching of the switches 122 and 106 are simultaneously when power is supplied to the plunger 116. However, when the switching of these switches is performed mechanically as shown in FIG. 1, it is impossible to judge which of those pulses is generated later. It is for this reason that the timing to provide RM="1" is made to coincide with either the pulse CC or the pulse REL which is later.

The third case of the prestage process is that the operation lever 104 is moved from the REW position to the constant speed position or from the constant speed position to the REW position and the operation lever 104 is returned to its original position before the pulse TE becomes logical "0". The fourth case is that some erroneous operation causes the operation to shift to the operation mode to which the operation lever 104 is to be set. In such a case, no process is performed after MP=TE="0" and logical state of MP is returned to MP="1".

In the first case, or the second case with the pulse CC generated late, the flip-flop 801 is clocked by the pulse CC. When the tape end is present (TEM="0") or when the operation lever 104 is at the central position (Sd="0"), the first input terminal of the AND gate 844 is logical "1", so that the pulse CC passes through the AND gate 844 and the NOR gate 842 to reach the first input terminal of the NAND gate 816. When the flip-flop 801 is cleared at the leading edge of the signal Prg of logical "1", the logical level of the signal $\overline{\text{Prg}}$ is "0". When the flip-flop 801 is cleared by the pulse REL, the logical level of the signal $\overline{\text{Prg}}$ is unknown. When it is cleared by the pulse REL, however, since the output signal X of the EXOR gate 812 is logical "1" the input signal $\overline{\text{X}}$ at the first input terminal of the AND gate 820 is logical "0", so that the second input terminal of the NAND gate 818 is logical "0".

Accordingly, when the flip-flop 801 is cleared by the signal Prg, the first input terminal of the NAND gate 818 is logical "0" and when it is cleared by the pulse REL, the second input terminal of the NAND gate 818 is logical "0". The logical level of the pulse CP1 applied to the second input terminal of the NAND gate 816 is logical "1" regardless of the pulse to clear the flip-flop 801. After the power source switch 200 is turned on and the initialization of the circuit is performed, the logical level of the $\overline{\text{Ini}}$ is logical "1" and therefore the NAND gate 816 is open. In other words, the pulse CC is applied to the clock terminal of the flip-flop 801, through the AND gate 844, the NOR gate 842 and the NAND gate 816. In this manner, when the pulse CC is produced with delay in the first or the second case, the flip-flop 801 is clocked to MP="1".

In the third case, the pulse REL is used. The flip-flop 801 is clocked by the pulse REL only when $\overline{\text{MP}}$="1", TEM="1", TE="1", $\overline{\text{Prg}}$="1" and FF="1". The condition is held depending on the AND gate 848. The reason why the condition of FF="1" is additionally employed is that, when the operation shifts from the constant speed transport mode to the REW mode, it must be prevented that, immediately after MP="0" is given by the pulse REL, then MP="1" holds. In other words, if the condition REL="1" still holds after the condition MP="0" is obtained by the pulse REL, there is a possibility that the conditions REL="1", $\overline{\text{MP}}$="1", TEM="1", and $\overline{\text{Prg}}$="1" hold instantaneously. The signal FF becomes logical "0" immediately after the operation lever 104 is positioned at the REW mode position. When the flip-flop 801 is clocked by the pulse REL, the AND gate 848 is closed. The AND gate 840 is also closed when TEM="1", i.e. $\overline{\text{TEM}}$="0". Accordingly, the flip-flop 801 is never clocked by the pulse REL immediately after MP="0" is obtained by the pulse REL. When the time constant of the delay circuit 850 is much larger than that of the delay circuit in FIG. 10, the signal FF applied to the AND gate 848 may be omitted.

In the second case, the pulse REL is also used when the pulse REL occurs following the pulse CC. When the flip-flop 801 is cleared, MP="0" and thus the output of the NAND gate 832 is logical "1". At this time, when the pulse CC becomes logical "1", the output of the NAND gate 834 becomes logical "0" and the output of the NAND gate 838 becomes logical "1". Thus, the pulse CC of logical "1" is latched in a flip-flop composed of the NAND gates 836 and 838. Then, the logical level of the pulse CC returns to logical "0", the output logical level "1" of the NAND gate 838 is held until the output of the NAND gate 832 becomes logical "0" by the MP="1". In the second case, the tape end is detected and therefore TEM="0". Accordingly, the AND gate 840 is in a state allowing the passage of the pulse REL. That is, the flip-flop 801 is clocked by the pulse REL.

In the fourth case, the output signal HEL of the NAND gate 824 is used. The signal HEL rises (logical level "0"→"1") at the time of MP=TE="0" and falls ("1"→"0") at MP=TE="1". In this case, the flip-flop 801 is clocked only when the output signal ML of the flip-flop 701 is equal to the D-input signal Sr thereof. In other words, when ML=Sr, the output signal X of the EXOR gate 812 is logical "0", so that the logical level of the signal $\overline{\text{X}}$ applied to the first input terminal of the AND gate 820 becomes "1". At this time, if the output signal TEM of the flip-flop 401 is logical "1", the AND gate 820 is open. The flip-flop 801 is clocked and MP="1" holds when the power supply to the motor 102 is stopped (MP="0") and the stop of the reel shafts 108 and 110 is confirmed (TE="0").

Figure 12:
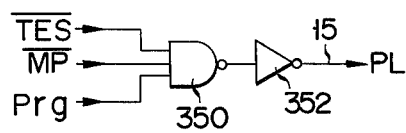

FIG. 12 shows a logic circuit for providing the condition to supply power to the plunger 116 shown in FIG. 1. The signals Prg, $\overline{MP}$ and $\overline{TES}$ are applied to the first to third input terminals of a NAND gate 350. The output of the NAND gate 350 is converted into a signal PL through an inverter 352. The logical level of the signal PL becomes "1" only when the motor 102 and the reel shafts 108, 110 are stopped ($\overline{MP}=\overline{TES}$="1") and Prg="1".

Reference is made again to FIG. 4. The signal PL is derived from a pin 15 of the control IC 204 and is applied to the base of an NPN transistor Q14 through a resistor R34. The emitter and collector of the transistor Q14 are coupled with the base and collector of an NPN transistor Q16, respectively. The transistor Q16 is grounded at the emitter and connected at the collector to the power source circuit of the voltage VE through a solenoid coil of the plunger 116. The solenoid coil of the plunger 116 is connected in parallel with a diode D12 for absorbing inverse voltage pulses. Upon the provision of the signal PL of logical "1" from the control IC 204, the transistors Q14 and Q16 are turned on and the plunger 116 is supplied with current. By the current supply of the plunger, the operation lever 104 in FIG. 1 is returned to the central position and the head to contact the tape is switched from the head 118 to the head 120 or from 120 to 118. Further, by the current supply of the plunger 116, the switch 106 is positioned corresponding to a logical state that F1=F2="1" and the contact states of the switches 122 and 124 is switched.

A switch 124 of double-gang two-contact type is connected at two contact terminals a and b to the DC motor 102. In the switch 124, two contacts c and f are grounded and another two contacts d and e are connected to the emitter of an NPN transistor Q18. The emitter of the transistor Q18 is grounded through the cathode-anode path of a diode D14 for absorbing an inverse voltage pulse. A capacitor C24 for absorbing pulse-type noise is connected to the diode D14 in parallel. The base of the transistor Q18 is connected to the pin 14 of the control IC 204, through a resistor R36. The output signal MP of the flip-flop 801 shown in FIG. 11 is derived from the pin 14. When the flip-flop 801 is preset or clocked and MP="1" holds, the transistor Q18 is turned on and power is supplied to the motor 102.

The collector of the transistor Q18 is connected to the pin 16 of a speed control IC 216 of the motor 102. The voltage VC is applied to the pin 15 of the IC 216 and the pin 14 is grounded. The pin 11 is earthed through a capacitor C26 and connected to the collector of an NPN transistor Q20. The emitter of the transistor Q20 is connected to the pin 3 directly and to the pin 2 through a resistor R38. The collector of the transistor Q20 is connected to the pin 5 through a series circuit of a variable resistor R40 and a resistor R42. The pin 5 is grounded through a capacitor C28. The pin 4 of the IC 216 is grounded through a capacitor C30 and the pins 6 and 8 are grounded through a capacitor C32.

TCA955 manufactured by SIEMENS in West Germany may be used for the speed control IC 216. The peripheral circuitry of the IC 216 shown in FIG. 4 is substantially the same as an application as shown in FIG. 26, for example, described in the application note of the same company. The main difference of the circuit from that shown in FIG. 4 of this invention is the Hall IC 218 used for an element to detect the motor speed of the motor 102. The circuit construction of the IC 216 is not essential to the invention and therefore no elaboration thereof will be given except for the following. The speed of rotation of the motor 102 is detected by the Hall IC 218 and the rotation speed is kept constant in the constant speed mode. When the detection of the motor speed by the Hall IC 218 is interrupted, the current supplied to the motor 102 is maximized to drive the motor at a high speed.

The output signal from the Hall IC 218 is applied through a resistor R44 to the base of the transistor Q20. The Hall IC 218 is biased by the voltage VE and is located within the motor 102 for detecting a magnetic flux change caused by the rotation of the rotor of the motor 102. The Hall IC 218 feeds a pulse signal with a period proportional to the rotation speed of the motor 102 back to the base of the transistor Q20. The base of the transistor Q20 is grounded through a collector-emitter path of an NPN transistor Q22. The base of the transistor Q22 is connected through a resistor R46 to the pin 13 of the control IC 204. The output signal $\overline{ML}$ or MF of the flip-flop 701 in FIG. 9 is derived from the pin 13. When MF="0", the transistor Q22 is cut off. In this case, a servo loop is formed to drive the motor 102 at a constant speed. When ML="1", the transistor is turned on and the servo loop is interrupted. The result is a high speed rotation of the motor 102.

The output signal $\overline{TEM}$ from the flip-flop 401 is derived from the pin 17 of the control IC 204. The signal $\overline{TEM}$ is applied to a recording amplifier (not shown). In this embodiment, the circuit in FIG. 4 and the tape transport mechanism in FIG. 1 may be assembled into a single unit to constitute a tape deck of a plug-in type which may smoothly be coupled with and decoupled from a tape recorder/tape player body. Let us consider a case where the tape deck is coupled with a tape recorder of the home-use type, for example. In this case, when the tape end is detected and $\overline{TEM}$="1", then the power supply of the input voltage Vin in FIG. 3 is shut off. Accordingly the apparatus is in an auto-stop mode in place of the tape transport reversing operation such as an auto-reverse. Alternatively, the $\overline{TEM}$="1" may be used for inhibiting only the auto-reverse recording. When the tape deck or transport is coupled with a tape player for an automobile, the functions such as an auto-reverse, an auto-rewind and an auto-repeat are alive unless the input voltage Vin is shut off by $\overline{TEM}$="1".

Figure 13:
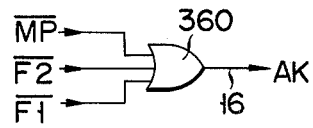

A signal AK for muting is derived from the pin 16 of the control IC 204. The signal AK is formed by logically summing the signals $\overline{F1}$, $\overline{F2}$ or $\overline{MP}$ by an OR gate 360, as shown in FIG. 13, for example. The signal AK becomes logical "1" when the power supply to the motor 102 is stopped ($\overline{MP}$="1"), or when the operation lever 104 points to the FF position or the REW position ($\overline{F1}$="1" or $\overline{F2}$="1"). The signal AK is coupled with a tape recorder/tape player body and is used for muting in the operation mode other than a record/playback mode.

Figure 14:
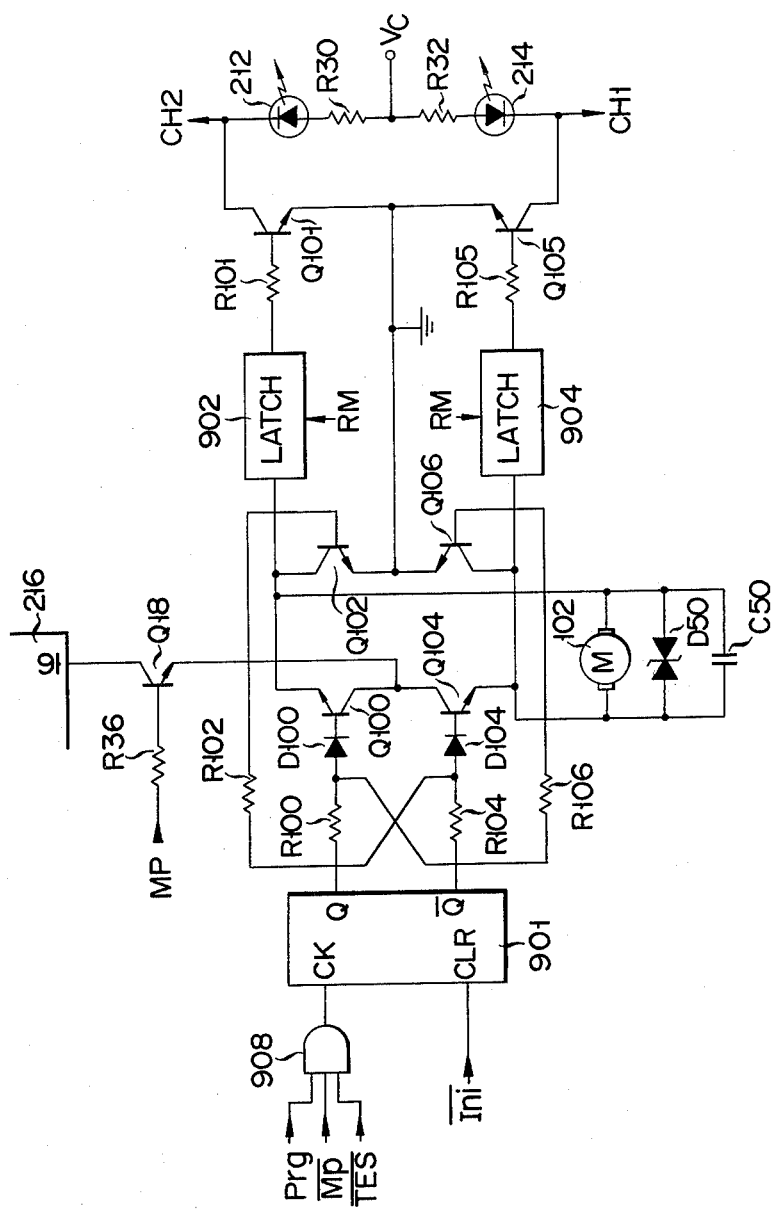
FIG. 14 shows a circuit diagram to electrically reverse the direction of rotation of a motor 102.

FIG. 14 shows a circuit for reversing the rotation direction of the motor 102 without using the plunger 116. The switch 124 shown in FIG. 4 is a mechanical switch which is interlocked with the plunger 116. In the embodiment in FIG. 14, four transistors Q100 to Q106 are substituted for the switch 124. The collectors of the NPN transistors Q100 and Q104 are connected to the emitter of the transistor Q18. The motor 102 is connected between the emitters of the transistors Q100 and Q104. A bidirectional Zener diode D50 and a capacitor C50 are connected in parallel to the motor 102 for the purpose of absorbing pulses. The emitters of the transistors Q100 and Q104 are connected with the collectors of the NPN transistors Q102 and Q106, respectively. The emitters of the transistors Q102 and Q106 are both grounded.

The base of the transistor Q100 is connected to the output terminal Q of a flip-flop 901, through a diode D100 and a resistor R100. The base of the transistor Q104 is connected through a diode D104 and a resistor R104 to the output terminal $\overline{Q}$ of the flip-flop 901.

The diodes D100 and D104 are provided to prevent breakdown between the base and emitter of each of the transistors Q100 and Q104 when an inverse bias voltage is applied between the bases and emitters thereof. Therefore, when the withstand voltage of the transistors when inversely biased is higher than the voltage supplied to the motor, the diodes D100 and D104 may be omitted. The node between the resistor R100 and the anode of the diode D100 is connected to the base of the transistor Q106 through a resistor R106. The node between the resistor R104 and the anode of the diode D104 is connected to the base of the transistor Q102, through a resistor R102.

The emitter of the transistor Q100 is connected to the base of an NPN transistor Q101, through a latch 902 and a resistor R101. The emitter of the transistor Q104 is coupled with the base of an NPN transistor Q105, through a latch 904 and a resistor R105. The emitters of the transistors Q101 and Q105 are both grounded. The voltage VC is applied to the collector of the transistor Q101, through the resistor R30 and the LED212. The voltage VC is applied through the resistor R32 and the LED214 to the collector of the transistor Q105. The transistors Q101 and Q105 correspond to the switch 122 in FIG. 4. The signals CH2 and CH1 are derived from the collectors of the transistors Q101 and Q105.

The flip-flop 901 is cleared by the pulse $\overline{\text{Ini}}$. Upon being cleared, it produces output signals Q="0" and $\overline{Q}$="1". At this time, the transistors Q104 and Q102 are turned on while the transistors Q100 and Q106 are both turned off. The current fed from the transistor Q18 flows from the emitter of the transistor Q104 to the collector of the transistor Q102 through the motor 102. At this time, the emitter of the transistor Q104 is at high potential while the emitter of the transistor Q100 is at low potential. Accordingly, if the latches 902 and 904 are both in the pass state, the transistor Q105 is turned on while the transistor Q101 is turned off. As a result, the LED 214 lights up and the logical level of the signal CH1 is "0". In this case, the motor 102 is rotated in the direction corresponding to the forward direction of the channel 1 and enters into the forward mode.

The flip-flop 901 is clocked by the output signal of an AND gate 908 to which the signals Prg, $\overline{\text{MP}}$ and $\overline{\text{TES}}$ are applied. The flip-flop 901 may be considered as a toggle flip-flop which is inverted at the leading edge of the output signal from the AND gate 908. The output of the AND gate 908 is the same as the output signal PL of the inverter 352 shown in FIG. 12. Accordingly, the flip-flop 901 is clocked at the same timing as the current supply of the plunger 116. When clocked by the output of the AND gate 908, the outputs of the flip-flop become Q="1" and $\overline{Q}$="0". At this time, if the latches 902 and 904 are in the pass state, the transistors Q100, Q106 and Q101 are turned on while the transistors Q104, Q102 and Q105 are turned off. Then, the LED 212 lights up and the signal CH2 becomes logical "0", so that the current direction of the current fed to the motor 102 is inverted. In this case, the motor 102 is rotated in the direction corresponding to the forward direction of the channel 2 and enters into the reverse mode.

The latches 902 and 904 are so designed that, when receiving the signal RM of logical "1" from the flip-flop 601 in FIG. 8, it latches the input level. Thus, in the REW mode, the current polarity of the motor 102 is merely inverted and a channel display by the LED 212 or 214 is not switched.

When the plunger 116 is omitted by employing the FIG. 14 construction, the mechanism shown in FIG. 1 is further simplified. In this case, the heads 118 and 120 remain contacting the casette tape. Accordingly, the selection of the head 118 or 120 may be made by switching a record/playback signal by means of an analog switch (not shown). The analog switch may be constructed by a known transistor (or FET) switch circuit and its on/off control is performed by the outputs Q and $\overline{Q}$ of the flip-flop 901. Further, the returning of the operation lever 104 to the central position in the step 25 in FIG. 2 may be made by using the kinetic energy stored in a capstan flywheel when the motor 102 is stopped.

The operations of the flip-flops 301, 401, 601, 701 and 801 will be summarized with relation to the flow chart in FIG. 2.

1. First Flip-flop 301 (FIG. 5)
   (1) After the program switch 206 is turned on in the constant speed transport mode (step 11), the flip-flop 301 is clocked.
   (2) After the operation is switched from the REW mode to the constant speed transport mode (step 20), it is clocked.
   (3) After the operation is switched from the constant speed mode to the REW mode (step 15), it is clocked.
   (4) After the tape end is detected (step 11 or step 24), it is clocked.

2. Second Flip-flop 401 (FIG. 6)
   After the tape end is detected (step 9 or 17; YES) and the process in preparation for the next operation mode (step 10, 11 or steps 23 to 25) is completed, the flip-flop 401 is cleared.

3. Third Flip-flop 601 (FIG. 8)
   (1) When the operation is switched from the constant speed transport mode to the REW mode (step 15), the data "1" is loaded into the flip-flop 601.
   (2) After the operation is switched from the REW mode to the constant speed transport mode (step 20), the data "0" is loaded thereinto.

4. Fourth Flip-flop 701 (FIG. 9)
   (1) When the operation is switched from the constant speed transport mode to the FF mode (step 22), or when the operation is switched from the constant speed transport mode to the REW mode (step 16), the data "0" is loaded into the flip-flop 701.
   (2) When the operation is switched from the FF mode or the REW mode to the constant speed transport mode (step 6), the data "1" is loaded thereinto.

(3) When the tape end is detected in the FF mode or the REW mode (step 17; YES), the data "1" is loaded thereinto.

5. Fifth Flip-flop 801 (FIG. 11)

(1) After the program switch 206 is turned on in the constant speed transport mode (step 10), the flip-flop 801 is cleared.

(2) After the operation is switched from the REW mode to the constant speed transport mode (step 19), it is cleared.

(3) After the operation is switched from the constant speed mode to the REW mode (step 14), it is cleared.

(4) After the tape end is detected (step 10 or 23), it is cleared.

The logic control circuit to realize the control flow in FIG. 2 is formed by the combination of the above-mentioned five flip-flops and on/off states of the switches 106, 122, 124 and 200 mounted to the mechanism in FIG. 1.

Although specific constructions have been illustrated and described herein, it is not intended that the invention be limited to the elements and constructions disclosed. One skilled in the art will recognize that the particular elements or subconstructions may be used without departing from the scope and spirit of the invention. For example, the flow control of FIG. 2 may be realized by using a microprocessor of 4 to 8 bits, for example, Model 8048 manufactured by INTEL corp. in the U.S.A..

What we claim is:

1. A method for controlling a single-motor type microcassette tape transport which transports tape in a microcassette at a constant speed, comprising:

terminating the control of a microcassette tape transport when no microcassette tape is loaded into a transport (step 3 "NO");

judging, when a microcassette tape is loaded thereinto (step 3 "YES"), whether or not it is immediately after the loading of the microcassette tape into the tape transport (step 4) and, when it is immediately after the loading, rotating said motor at a constant speed (step 6), and, when it is not immediately after the loading, continuing a constant speed rotation of the motor (step 6);

reversing the direction of the constant speed transport of the tape of a microcassette caused by the constant speed rotation of the motor (step 8 "YES") by stopping the motor (step 10), reversing the direction of rotation of the motor (step 11), and then causing the motor to rotate at a constant speed in said reverse direction (step 6);

changing the operation mode of the tape transport from a constant speed tape transporting mode to a rewind mode (step 12 "YES") responsive to a command, by judging whether or not the tape transport in the rewind mode (step 13) and, if it is not in the rewind mode (step 13 "NO"), stopping the motor (step 14), reversing the direction of rotation of the motor (step 15) and subsequently causing the motor to rotate at high speed (step 16), and, if it is in the rewind mode (step 13 "YES"), causing the motor to rotate at high speed (step 16);

changing the operation mode of the tape transport from the constant speed tape transporting mode to fast forward mode (step 12 "NO") responsive to a command by judging whether or not it is after the rewind mode (step 18), and, if it is after the rewind mode (step 18 "YES"), stopping the motor (step 19), reversing the direction of rotation of the motor (step 20) and subsequently causing the motor to rotate at high speed (step 22), and if it is not after the rewind mode (step 18 "NO"), causing the motor to rotate at high speed (step 2);

returning the operation mode from the rewind mode to the constant speed transport mode (step 12 "NO"; step 18 "YES"; step 21 "NO"), by stopping the motor (step 19), reversing the direction of rotation of the motor (step 20) and subsequently causing the motor to rotate at a constant speed (step 6);

returning the operation mode from the fast forward mode to the constant speed tape transporting mode (step 12 "NO"; step 18 "NO"; step 21 "NO"), by causing the motor to rotate at a constant speed (step 6); and changing the operation mode from the rewind mode to the constant speed tape transporting mode to transport the microcassette tape in an opposite direction to that in the rewind mode (step 17 "YES"), by stopping the motor (step 23), reversing the direction of rotation of the motor (step 24), and subsequently causing the motor to rotate at a constant speed (step 6).

2. In apparatus for controlling a single-motor type microcassette tape transport, comprising:

a first designation means (106) for selectively designating a constant speed tape transporting mode, a rewind mode, or a fast forward mode;

a second designation means (124) for designating a direction of the motor rotation;

a third designation means (122) for designating a direction of the tape transport;

means for detecting the end of the tape; and means responsive to end of tape detection for stopping the motor and reversing its direction of rotation;

the improvement comprising:

control means coupled to said first, second and third designation means and to said tape transport for controlling the tape transport on the basis of a combination of designations by said first, second and third designation means, said control means comprising:

a first memory means (301) responsive at least to said first designating means and operating when the operation mode is shifted from the constant speed tape transporting mode to the rewind mode, when it is returned from the rewind mode to the constant speed tape transporting mode, or when the end of a tape is detected by said end of tape detecting means, and for generating a signal (prg) indicating that a direction of the motor rotation is reversed;

a second memory means (401) responsive at least to said end of tape detecting means and operating from the time of detection of the end of tape until the motor stops and reverses its direction of rotation, and for providing a signal (TEM) indicating tape end detection;

a third memory means (601) responsive to said first designation means and operating when the operation mode is shifted from the constant speed tape transporting mode to the rewind mode or when it is returned from the rewind mode to the constant speed tape transporting mode, and for generating a signal (RM) to distinguish between the rewind mode and the fast forward mode;

a fourth memory means (701) responsive at least to said first designation means and operating when the operation mode is shifted from the constant speed tape transporting mode to the rewind mode or the fast forward mode, when it is returned from the rewind mode or the fast forward mode to the constant speed tape transporting mode, or when the tape end is detected in the rewind mode or the fast forward mode, and for generating a signal (ML or MF) to change a speed of the motor rotation so that the motor is rotated at high speed in the rewind mode or the fast forward mode; and a fifth memory means (801) responsive at least to said first designation means and operating when the operation mode is shifted from the constant speed tape transporting mode to the rewind mode, when it is returned from the rewind mode to the constant speed tape transporting mode, or when the tape end is detected, for generating a signal for causing rotation or alternatively stopping of the motor;

whereby the memory states of said first, fourth and fifth memory means are determined depending on the memory contents of at least one of said first to fifth memory means and designations by at least one of said first to third designation means.

3. Apparatus according to claim 13, wherein the tape transport includes an operation lever (104), the first designation means includes a first switch (106) interlocked with said operation lever (104) so as to be switched responsive to operation of said operation lever (104).

4. Apparatus according to claim 2, wherein the second designation means includes a second switch (124) switched according to a transport direction of the tape.

5. Apparatus according to claim 2, wherein the third designation means includes a third switch (122) switched according to a channel of the tape.

6. Apparatus according to any one of claims 2, 3, 4 or 5, further comprising: an operation lever (104) to select a tape transporting operation in the tape transport; and a program switch (206) which is turned on when a transport direction of the tape running at a constant speed is reversed; and wherein said end of tape detection means (446) detects the end of a tape transport under a given condition ($\overline{TES}$="1", MP="1").

7. Apparatus according to claim 6, wherein the first memory means includes a first flip-flop (301) which is clocked in any one of the following cases:
 (a) after the program switch is turned on in a constant speed tape transporting mode (step 11);
 (b) after the operation mode is switched from the rewind mode to the constant speed tape transporting mode (step 20);
 (c) after the operation mode is switched from the constant speed tape transporting mode to the rewind mode (step 15); and
 (d) after the tape end is detected (step 11 or 24).

8. Apparatus according to claim 6, wherein the second memory means includes a second flip-flop (401), and including means for clearing said second flip-flop after the tape end is detected (step 9 or 17) and the process in preparation for the next operation mode (steps 10, 11 or steps 23 to 25) is completed.

9. Apparatus according to claim 6, wherein the third memory means includes a third flip-flop (601) into which data "1" is loaded when the operation mode is switched from the constant speed tape transporting mode to the rewind mode (step 15) and into which data "0" is loaded after the operation mode is switched from the rewind mode to the constant speed tape transporting mode (step 20).

10. Apparatus according to claim 6, wherein the fourth memory means includes a fourth flip-flop (701) into which data "0" is loaded when the operation mode is switched from the constant speed tape transporting mode to the fast forward mode (step 22), or when the operation mode is switched from the constant speed tape transporting mode to the rewind mode (step 16), and data "1" is loaded when the operation mode is switched from the fast forward mode or the rewind mode to the constant speed tape transporting mode (step 6), and data "1" is loaded when the tape end is detected in the fast forward mode or the rewind mode (step 17).

11. Apparatus according to claim 6, wherein the fifth memory means includes a fifth flip-flop (801) which is cleared in any one of the following cases:
 (a) after the program switch (206) is turned on in the constant speed tape transporting mode (step 10);
 (b) after the operation mode is switched from the rewind mode to the constant speed tape transporting mode (step 19);
 (c) after the operation mode is switched from the constant speed tape transporting mode to the rewind mode (step 14); and
 (d) after the tape end is detected (step 10 or 23).

12. Apparatus for controlling a single-motor type microcassette tape transport which includes means for receiving a microcassette tape and means for transporting the tape in the microcassette at a constant speed, comprising:

means for sensing when a microcassette tape is in said receiving means and for terminating the control of a microcassette tape transport when no microcassette tape is loaded into the receiving means of the transport;

means for judging, when a microcassette tape is loaded into said receiving means, whether or not it is immediately after the loading of the microcassette tape into the receiving means of the tape transport and, when it is immediately after the loading, causing rotation of said motor at a constant speed, and, when it is not immediately after the loading, continuing a constant speed rotation of the motor;

means coupled to said motor for reversing the direction of the constant speed transport of the tape of a microcassette caused by the constant speed of the motor by stopping the motor, reversing the direction of rotation of the motor, and then causing the motor to rotate at a constant speed in said reverse direction;

means coupled to said motor for changing the operation mode of the tape transport from a constant speed tape transporting mode to a rewind mode responsive to a command, by judging whether or not the tape transport in the rewind mode and, if it is not in the rewind mode, stopping the motor, reversing the direction of rotation of the motor and subsequently causing the motor to rotate at high speed, and, if it is in the rewind mode, causing the motor to rotate at high speed;

means coupled to said motor for changing the operation mode of the tape transport from the constant speed tape transporting mode to fast forward mode responsive to a command by judging whether or not it is after the rewind mode, and, if it is after the rewind mode, stopping the motor, reversing the direction of rotation of the motor and subsequently causing the motor to rotate at high speed, and if it is not after the rewind mode, causing the motor to rotate at high speed;

means coupled to said motor returning the operation mode from the rewind mode to the constant speed transport mode, by stopping the motor, reversing the direction of rotation of the motor and subsequently causing the motor to rotate at a constant speed;

means coupled to said motor for returning the operation mode from the fast forward mode to the constant speed tape transporting mode, by causing the motor to rotate at a constant speed; and means coupled to said motor for changing the operation mode from the rewind mode to the constant speed tape transporting mode to transport the microcassette tape in an opposite direction to that in the rewind mode, by stopping the motor, reversing the direction of rotation of the motor, and subsequently causing the motor to rotate at a constant speed.

* * * * *

UNITED STATES PATENT AND TRADEMARK OFFICE
CERTIFICATE OF CORRECTION

PATENT NO. : 4,318,139
DATED : March 2, 1982
INVENTOR(S) : Tutomu SHIBATA, et al It is certified that error appears in the above-identified patent and that said Letters Patent is hereby corrected as shown below:

COLUMN 7, line 6, change "Logic circuit" to --In the logic circuit--;

COLUMN 26, line 6, change "(step 2)" to --(step 22)--;

COLUMN 27, line 33, change "claim 13" to --claim 2--.

Signed and Sealed this

Twentieth Day of July 1982

[SEAL]

Attest:

GERALD J. MOSSINGHOFF

Attesting Officer — Commissioner of Patents and Trademarks